US012773630B2

(12) United States Patent
Qian et al.

(10) Patent No.: US 12,773,630 B2
(45) Date of Patent: Oct. 27, 2026

(54) DISPLAY METHOD FOR VIRTUAL CHESSBOARD , TERMINAL, STORAGE MEDIUM AND PROGRAM PRODUCT

(71) Applicant: Tencent Technology (Shenzhen) Company Limited, Shenzhen (CN)

(72) Inventors: Shanshan Qian, Shenzhen (CN); Haohui Liang, Shenzhen (CN); Lin Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 591 days.

(21) Appl. No.: 18/217,114

(22) Filed: Jun. 30, 2023

(65) Prior Publication Data

US 2023/0338847 A1 Oct. 26, 2023

Related U.S. Application Data

(63) Continuation of application No. PCT/CN2022/126425, filed on Oct. 20, 2022.

(51) Int. Cl.

*A63F 13/533* (2014.01)
*A63F 13/537* (2014.01)
*A63F 13/55* (2014.01)

(52) U.S. Cl.

CPC .......... *A63F 13/533* (2014.09); *A63F 13/537* (2014.09); *A63F 13/55* (2014.09); *A63F 2300/308* (2013.01)

(58) Field of Classification Search

CPC ...... A63F 13/533; A63F 13/537; A63F 13/55; A63F 2300/308

See application file for complete search history.

(56) References Cited

U.S. PATENT DOCUMENTS 9,715,213 B1 7/2017 Young
2020/0047071 A1* 2/2020 D'angelo .............. A63F 13/497

(Continued)

FOREIGN PATENT DOCUMENTS

CN 108888950 A 11/2018
CN 110124315 B * 5/2019

(Continued)

OTHER PUBLICATIONS

English Machine translation of CN 113101660A Written Description. Online. Jul. 13, 2021. Acquired from Espacenet. Acquired Nov. 26, 2025. < URL: https://worldwide.espacenet.com/patent/search/family/076718222/publication/CN113101660A?q=CN%20113101660A> (Year: 2021).*

(Continued)

*Primary Examiner* — Carl V Larsen
(74) *Attorney, Agent, or Firm* — Crowell & Moring LLP

(57) ABSTRACT

Embodiments of this application disclose a display method for a virtual chessboard, a terminal, a storage medium and a program product, and belong to the technical field of human-machine interaction. The method includes: displaying a first virtual chessboard; displaying, in response to a lineup viewing operation for a target opponent, a second virtual chessboard corresponding to the target opponent; acquiring, in response to a marking operation for at least one target virtual chess piece in the second virtual chess piece, chess piece information of the target virtual chess piece; and displaying, based on the chess piece information, the first virtual chess piece and the target virtual chess piece through the first virtual chessboard.

20 Claims, 12 Drawing Sheets

(56) References Cited

U.S. PATENT DOCUMENTS

| | | | | |
|---|---|---|---|---|
| 2021/0213361 | A1* | 7/2021 | Abecassis | A63F 13/35 |
| 2023/0049033 | A1 | 2/2023 | Zhang et al. | |
| 2023/0390637 | A1* | 12/2023 | Zhang | A63F 13/533 |

FOREIGN PATENT DOCUMENTS

| | | | |
|---|---|---|---|
| CN | 111282274 | | 6/2020 |
| CN | 112044070 | A | 12/2020 |
| CN | 112107857 | A | 12/2020 |
| CN | 112843737 | | 5/2021 |
| CN | 112915529 | A | 6/2021 |
| CN | 112933594 | | 6/2021 |
| CN | 113101660 | A | 7/2021 |
| CN | 113144596 | | 7/2021 |
| CN | 113198178 | A | 8/2021 |
| CN | 114100133 | | 3/2022 |
| EP | 2 783 734 | | 10/2014 |
| JP | 2006-320770 | A | 11/2006 |
| JP | 2014-195599 | A | 10/2014 |

OTHER PUBLICATIONS

Office Action issued in Japanese Patent Application No. 2024-522660 dated Feb. 20, 2025, w/English translation (6 pages).

Office Action issued in Chinese Patent Application No. 202111475697.4 dated Apr. 30, 2025, w/English translation, 16 pages.

International Search Report and Written Opinion of PCT application PCT/CN2022/126425 including translation dated Jan. 11, 2023 (12 pages).

* cited by examiner

DISPLAY METHOD FOR VIRTUAL CHESSBOARD , TERMINAL, STORAGE MEDIUM AND PROGRAM PRODUCT

CROSS-REFERENCE TO RELATED APPLICATIONS

This application is a continuation of PCT/CN2022/126425, filed Oct. 20, 2022, which claims priority to Chinese Patent Application No. 202111475697.4, filed on Dec. 6, 2021, and entitled "DISPLAY METHOD FOR VIRTUAL CHESSBOARD, TERMINAL, STORAGE MEDIUM AND PROGRAM PRODUCT", wherein each of the aforementioned applications is hereby incorporated herein by reference in its entirety.

FIELD OF THE TECHNOLOGY

This application relates to the technical field of human-machine interaction, in particular to a display method for a virtual chessboard, a terminal, a storage medium and a program product.

BACKGROUND OF THE DISCLOSURE

Autochess is a multiplayer strategy game. A user may match and cultivate a chess piece lineup by oneself to compete with an opponent lineup. During competition, chess pieces will automatically engage in battles, a health point of a defeated party is deducted, and finally, a battle rank is determined according to an elimination sequence.

SUMMARY

Embodiments of this application provide a display method for a virtual chessboard, a terminal, a storage medium and a program product, which can avoid situations of affecting a layout of virtual chess pieces due to a user memory error, or frequent operations and waste of preparation time due to multiple trips between a second virtual chessboard and a first virtual chessboard of each opponent, thereby improving preparation efficiency. The technical solutions are as follows:

In an aspect, an embodiment of this application provides a display method for a virtual chessboard, including:

- displaying a first virtual chessboard, the first virtual chessboard containing a first virtual chess piece;
- displaying, in response to a lineup viewing operation for a target opponent, a second virtual chessboard corresponding to the target opponent, the second virtual chessboard containing a second virtual chess piece;
- acquiring, in response to a marking operation for at least one target virtual chess piece in the second virtual chess piece, chess piece information of the target virtual chess piece; and
- displaying, based on the chess piece information, the first virtual chess piece and the target virtual chess piece through the first virtual chessboard.

In another aspect, an embodiment of this application provides a display apparatus for a virtual chessboard, including:

- a first display module, configured to display a first virtual chessboard, the first virtual chessboard containing a first virtual chess piece;
- a second display module, configured to display, in response to a lineup viewing operation for a target opponent, a second virtual chessboard corresponding to the target opponent, the second virtual chessboard containing a second virtual chess piece;
- a first acquiring module, configured to acquire, in response to a marking operation for at least one target virtual chess piece in the second virtual chess piece, chess piece information of the target virtual chess piece; and
- a third display module, configured to display, based on the chess piece information, the first virtual chess piece and the target virtual chess piece through the first virtual chessboard.

In another aspect, an embodiment of this application provides a terminal, including:

- at least one processor;
- at least one memory, the at least one memory storing at least one computer program; and
- wherein the at least one processor is configured by the at least one computer program to:
- chess piece;
- display a first virtual chessboard, the first virtual chessboard containing a first virtual
- display, in response to a lineup viewing operation for a target opponent, a second virtual chessboard corresponding to the target opponent, the second virtual chessboard containing a second virtual chess piece;
- acquire, in response to a marking operation for at least one target virtual chess piece in the second virtual chess piece, chess piece information of the target virtual chess piece; and
- display, based on the chess piece information, the first virtual chess piece and the target virtual chess piece through the first virtual chessboard.

In another aspect, an embodiment of this application provides a non-transitory computer readable storage medium, wherein the at least one computer program includes instructions for causing a processor to:

- display a first virtual chessboard, the first virtual chessboard containing a first virtual chess piece;
- display, in response to a lineup viewing operation for a target opponent, a second virtual chessboard corresponding to the target opponent, the second virtual chessboard containing a second virtual chess piece;
- acquire, in response to a marking operation for at least one target virtual chess piece in the second virtual chess piece, chess piece information of the target virtual chess piece; and
- display, based on the chess piece information, the first virtual chess piece and the target virtual chess piece through the first virtual chessboard.

According to an aspect of this application, a computer program product is provided, including at least one computer program, and the at least one computer program being loaded and executed by a processor to implement the display method for the virtual chessboard provided in various optional implementations in the aspect above.

DESCRIPTION OF EMBODIMENTS

Figure 1:
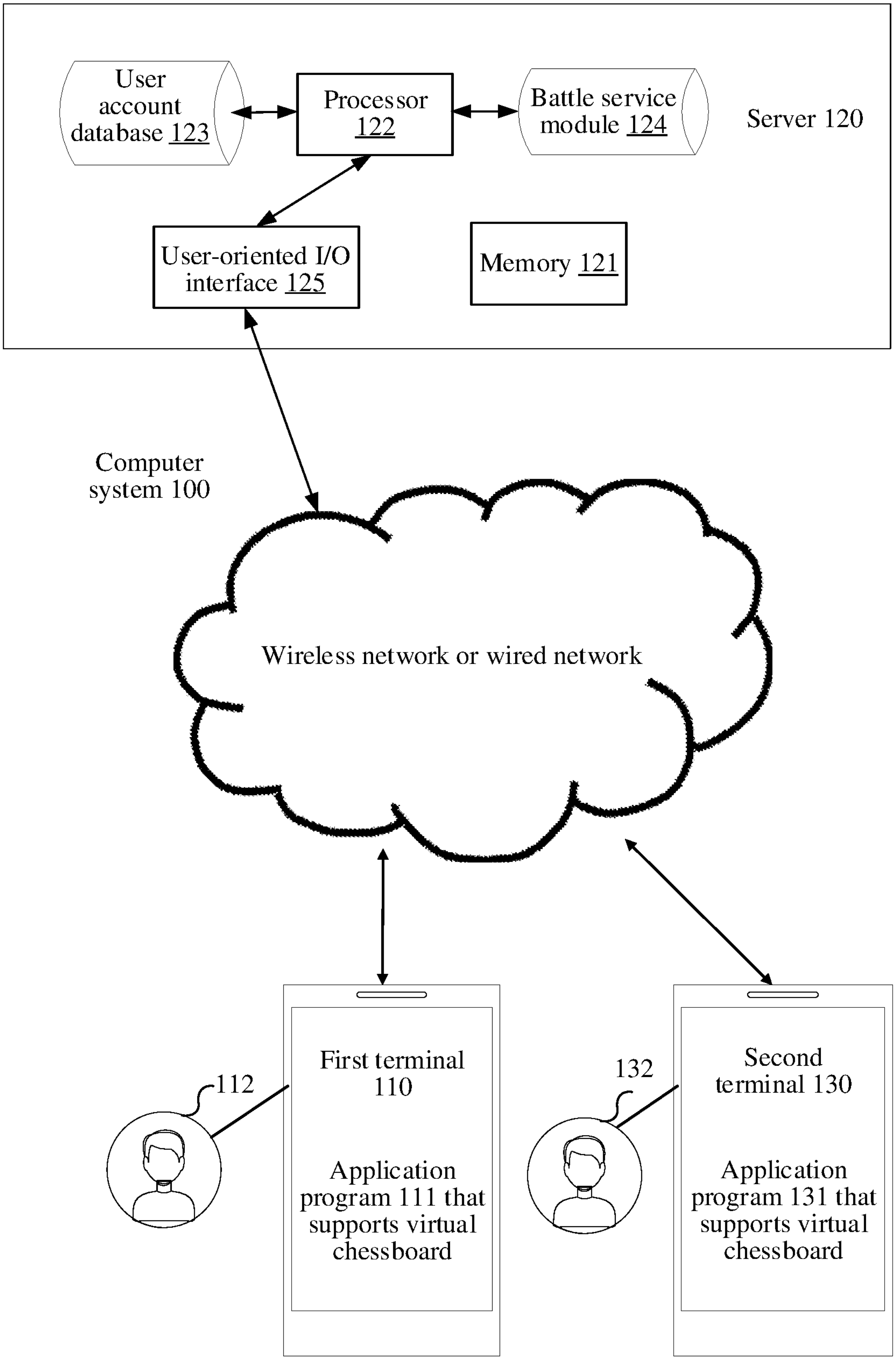
FIG. 1 is a schematic diagram of an implementation environment shown by an exemplary embodiment of this application.

A process within an autochess game is usually divided into a preparation period and a battle period, which are performed alternatively. In the preparation period, a user may use a virtual resource to acquire required chess pieces, and lay out them on own chessboard, and may view a lineup on an enemy chessboard so as to adjust own chess piece layout according to the enemy lineup.

However, in the related art, the user needs to go to the enemy chessboard to observe their lineup and layout behavior, and then return to own chessboard to make corresponding strategies. After the user returns to own chessboard, the enemy lineup may change at any time, and the user needs to perform a viewing operation for many times and adjust the lineup constantly, resulting in a cumbersome layout operation.

First, terms involved in the embodiment of this application are introduced briefly.

Autochess: autochess is a novel multiplayer strategy game. The user may match and cultivate a chess piece lineup by oneself to compete with an opponent lineup. A virtual health point of a defeated party is deducted, it is eliminated when a virtual health point is less than a threshold, and a rank is determined according to an elimination sequence.

Virtual chess piece: it is a different combat unit in autochess, and the user may perform operations such as equipping, upgrading, purchasing, selling, and adjusting a chess piece location of the virtual chess piece.

Preparation period: a process within an autochess game is divided into a preparation period and a battle period, which are performed alternatively. The preparation period refers to a truce time before each battle, during which the user may perform operations such as chessboard arrangement, chess piece purchase, and enemy lineup viewing.

Virtual chessboard: each user corresponds to one home chessboard and matches the lineup at the home chessboard within the preparation period. At the beginning of the battle, a teleportation gate transfers a virtual chess piece corresponding to the user to the home chessboard of an enemy (in some cases, an enemy virtual chess piece is transferred to own home chessboard) for the battle.

Bond: each virtual chess piece has at least two bonds, the bonds may provide additional strength for the virtual chess piece, and activating the bonds requires at least two virtual chess pieces with the bonds to go into battle simultaneously.

In the related art, in the preparation period, the user may use the virtual resource to acquire the required chess pieces, and lay out them on own chessboard, and may view the lineup on the enemy chessboard so as to adjust own chess piece layout according to the enemy lineup. However, in the related art, the user needs to go to the enemy chessboard to observe their lineup and layout behavior, and then return to own chessboard to make corresponding strategies. After the user returns to own chessboard, the enemy lineup may change at any time, and the user needs to perform a viewing operation for many times and adjust the lineup constantly, resulting in a cumbersome layout operation.

In order to solve the above technical problem, an embodiment of this application provides a display method for a virtual chessboard. Please refer to FIG. 1, which shows a schematic diagram of an implementation environment provided by an embodiment of this application. The implementation environment may include: a first terminal 110, a server 120 and a second terminal 130.

An application program 111 that supports the virtual chessboard is installed and run on the first terminal 110, and the application program 111 may be an autochess application program. When the first terminal runs the application program 111, a user interface of the application program 111 is displayed on a screen of the first terminal 110. The first terminal 110 is a terminal used by a first user 112. The first user 112 uses the first terminal 110 to control a first virtual chess piece located in a first virtual chessboard, perform operations such as equipping, upgrading, purchasing, selling, and adjusting a location of the chess piece, and arrange a complete lineup. The first virtual chess piece may be referred to as a master virtual chess piece of the first user 112. Schematically, the first virtual chess piece is a first virtual character, such as a simulation character or an anime character.

An application program 131 that supports the virtual chessboard is installed and run on the second terminal 130, and the application program 131 may be an autochess application program. When the second terminal 130 runs the application program 131, a user interface of the application program 131 is displayed on a screen of the second terminal 130. The second terminal 130 is a terminal used by a second user 132. The second user 132 uses the second terminal 130 to control a second virtual chess piece located in a second virtual chessboard, perform operations such as equipping, upgrading, purchasing, selling, and adjusting a location of the virtual chess piece, and arrange a complete lineup. The second virtual chess piece may be referred to as a master virtual chess piece of the second user 132. Schematically, the second virtual chess piece is a second virtual character, such as a simulation character or an anime character.

Optionally, the first virtual chess piece and the second virtual chess piece may belong to the same camp, the same team, and the same organization, have a friendly relationship, or have temporary communication permission. Optionally, the first virtual chess piece and the second virtual chess piece may belong to different camps, different teams, and different organizations, or have a hostile relationship.

Optionally, the application programs installed on the first terminal 110 and the second terminal 130 are the same, or the application programs installed on the two terminals are the same type of application programs on different operation system platforms (Android or IOS). The first terminal 110 may refer to one of the plurality of terminals in general, and the second terminal 130 may refer to another of the plurality of terminals in general. This embodiment is only illustrated by taking the first terminal 110 and the second terminal 130 as an example. Device types of the first terminal 110 and the second terminal 130 are the same or different. The device types include: at least one of a smartphone, a tablet computer, an e-book reader, an MP3 player, an MP4 player, a laptop computer, and a desktop computer.

In FIG. 1, only two terminals are shown, but in different embodiments, there are a plurality of other terminals that can access the server 120. Optionally, there is also one or more terminals corresponding to a developer, on which a development and editing platform of the application program supporting the virtual chess piece is installed. The developer may edit and update the application program on the terminal, and transmit an updated application program installation package to the server 120 through a wired or wireless network, and the first terminal 110 and the second terminal 130 may download the application program installation package from the server 120 to update the application program.

The first terminal 110, the second terminal 130 and other terminals are connected to the server 120 through a wireless network or a wired network. When receiving user operations such as an adding operation, an adjusting operation, a removing operation or an eliminating operation for the virtual chess piece, the terminal sends operation data to a backend server 120 based on operation results corresponding to the user operations, and the backend server updates chess piece information of each virtual chess piece. When receiving a marking operation for a target virtual chess piece, the terminal sends a chess piece information acquiring request to the backend server 120 to acquire the chess piece information, and displays the target virtual chess piece through a virtual chessboard corresponding to the terminal based on the chess piece information.

The server 120 includes at least one of one server, a server cluster composed of the plurality of servers, a cloud computing platform, and a virtualization center. The server 120 is used for providing backend service for the application program that supports the virtual chessboard. Optionally, the server 120 undertakes master computing work, and the terminal undertakes secondary computing work; or, the server 120 undertakes the secondary computing work, and the terminal undertakes the master computing work; or, the server 120 and the terminal adopt a distributed computing architecture for collaborative computing.

In a schematic example, the server 120 includes a memory 121, a processor 122, a user account database 123, a battle service module 124, and a user-oriented input/output interface (I/O interface) 125. The processor 122 is used for loading an instruction stored in the server 120, and processing data in the user account database 123 and the battle service module 124. The user account database 123 is used for storing data of user accounts used by the first terminal 110, the second terminal 130, and other terminals, such as avatars of the user accounts, nicknames of the user accounts, combat effectiveness indexes of the user accounts, and service areas where the user accounts are located. The battle service module 124 is used for providing a plurality of battle rooms for the user to battle, for example, 1V1 battle, 2V2 battle, 3V3 battle, etc. The user-oriented I/O interface 125 is used for establishing communication and exchanging data with the first terminal 110 and/or the second terminal 130 through the wireless network or the wired network.

Figure 2:
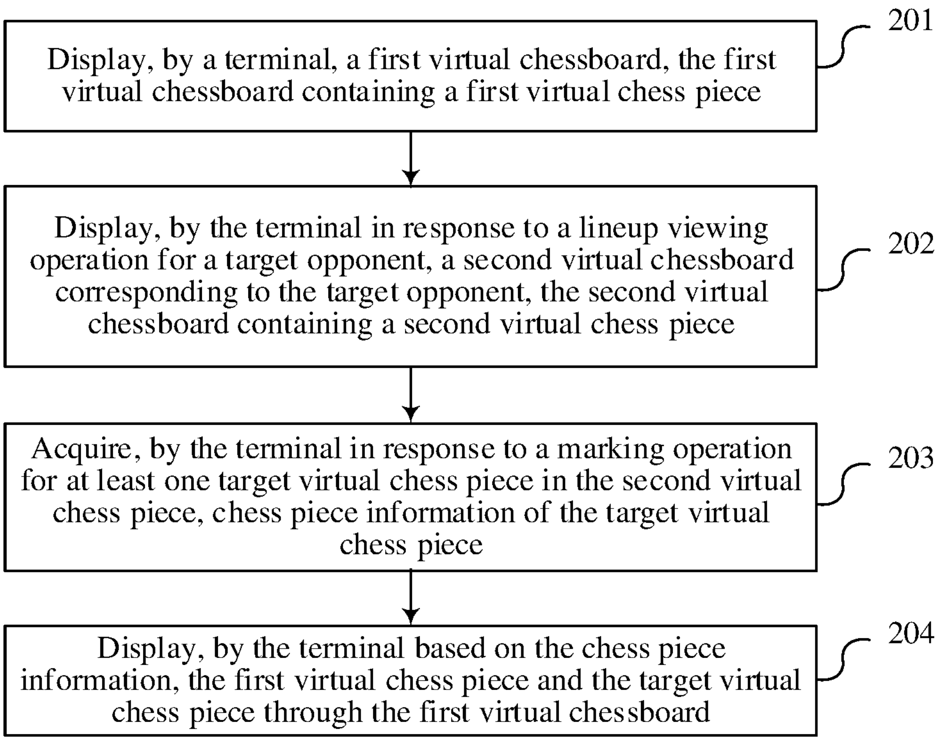
FIG. 2 is a flowchart of a display method for a virtual chessboard shown by an exemplary embodiment of this application.

FIG. 2 shows a flowchart of a display method for a virtual chessboard provided by an exemplary embodiment of this application. This embodiment takes application of this method to a terminal supporting a virtual environment as an example for illustration, and the method includes the following steps:

Step 201: Display, by the terminal, a first virtual chessboard, the first virtual chessboard containing a first virtual chess piece.

In some embodiments, autochess is divided into a preparation stage and a battle stage, which are performed alternatively. When in the preparation stage, the terminal displays the first virtual chessboard, and a user may adjust the first virtual chess piece within the first virtual chessboard. For example, chess piece replacement, chess piece acquiring, chess piece level improving, chess piece moving, etc. are performed to cope with the next round of battle. The first virtual chessboard is a virtual chessboard corresponding to a current login account, and the first virtual chess piece is a virtual chess piece corresponding to the current login account. When receiving an adjusting operation for the first virtual chess piece at the preparation stage, the terminal performs this operation to make corresponding adjustment to the first virtual chess piece. At the battle stage, the terminal automatically controls the first virtual chess piece for battle.

Optionally, the terminal displays the first virtual chessboard through a virtual chessboard interface, and the virtual chessboard interface further displays battle information (such as a remaining virtual health point, and account identification) of each opponent, and interface elements such as a user interface (UI) control.

Step 202: Display, by the terminal in response to a lineup viewing operation for a target opponent, a second virtual chessboard corresponding to the target opponent, the second virtual chessboard containing a second virtual chess piece.

In some embodiments, at the preparation stage, the user may trigger the display of a second chessboard of other opponents, and the second virtual chessboard contains the second virtual chess piece. The user may adjust the first virtual chess piece by observing the lineup layout of other opponents and thinking about a corresponding strategy, so as to prepare for the next stage of match.

Figure 3:
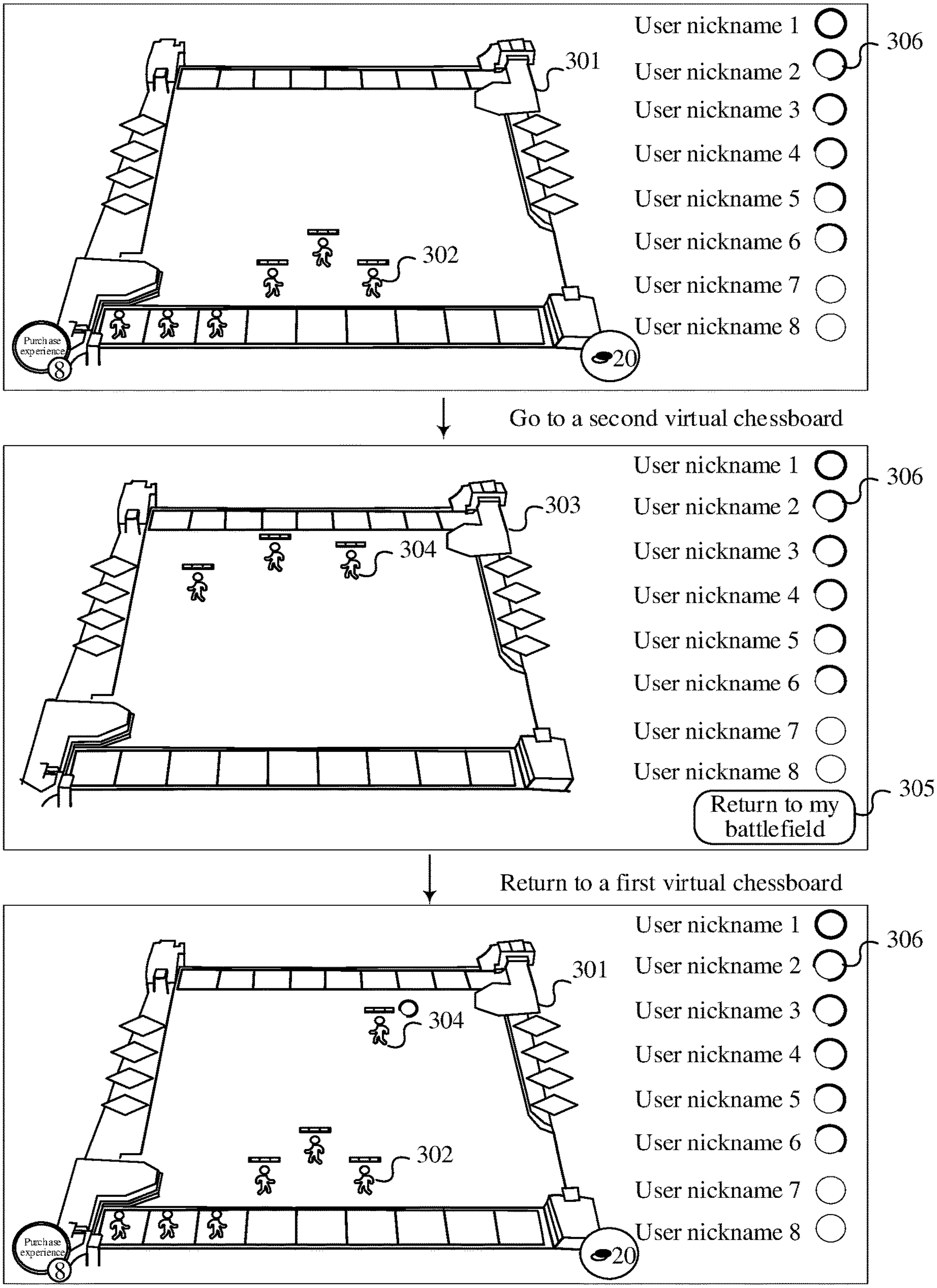
FIG. 3 is a schematic diagram of a process of marking a target virtual chess piece shown by an exemplary embodiment of this application.

FIG. 3 shows a schematic diagram of a process of switching display from the first virtual chessboard to the second virtual chessboard. When entering into the preparation stage, the terminal defaults to displaying the first virtual chessboard 301 through a virtual chessboard interface, and the first virtual chess piece 302 is displayed in the first virtual chessboard 301. In the virtual chessboard interface, battle information of each opponent (a user nickname, a user avatar, a remaining health point, etc.) is displayed on a right side of the first virtual chessboard 301. When receiving the lineup viewing operation for the target opponent 306, the terminal switches the first virtual chessboard 301 to the second virtual chessboard 303 corresponding to the target opponent 306 in the virtual chessboard interface, and the second virtual chess piece in a current moment field is displayed in the second virtual chessboard 303. Only one first virtual chess piece 302 is marked in FIG. 3, but in reality, there are totally six first virtual chess pieces 302 shown in FIG. 3.

During the display of the second virtual chessboard, the terminal acquires chess piece adjustment data of the target opponent from a backend server, and updates the second virtual chess piece in the second virtual chessboard based on the chess piece adjustment data, so as to achieve synchronous display of the operation for the target opponent. The user may observe the layout operation for the opponent through the second virtual chessboard.

Step 203: Acquire, by the terminal in response to a marking operation for at least one target virtual chess piece in the second virtual chess piece, chess piece information of the target virtual chess piece.

When acquiring the chess lineup and layout of other opponents by viewing the second virtual chessboard and then returning to the first virtual chessboard for lineup adjustment, the user needs to rely on memory for an adjusting operation. On the one hand, when there are a large number of opponents, it is difficult for the user to accurately remember the lineup of each opponent. On the other hand, during a time of the user returning from the second virtual chessboard to the first virtual chessboard and making lineup adjustment, other opponents may continue to make the lineup adjustment, resulting in that information remembered by the user is not consistent with an actual lineup, and the user may need to view the second virtual chessboard for multiple times.

In some embodiments, in order to improve efficiency of the lineup adjustment, an embodiment of this application provides a marking mechanism for a virtual chess piece. A user may go to the virtual chessboards of other opponents, observe and determine a virtual chess piece in the opponent lineup that has a significant impact on own lineup, and perform a marking operation on it, so that the user may still observe the marked virtual chess piece after returning to the first virtual chessboard.

After receiving the marking operation for the target virtual chess piece, the terminal acquires the chess piece information of the target virtual chess piece from the backend server. There is at least one target virtual chess piece, and there is at least one target opponent. That is, the user may mark the plurality of target virtual chess pieces for the same opponent, or may go to the second virtual chessboards of the plurality of different opponents to mark the target virtual chess piece, which is not limited in the embodiment of this application. The chess piece information includes a chess piece name, location, level, current attribute value, chess piece equipment, bond, etc.

Step 204: Display, by the terminal based on the chess piece information, the first virtual chess piece and the target virtual chess piece through the first virtual chessboard.

When receiving a return operation, the terminal switches from the second virtual chessboard to the first virtual chessboard. At this time, not only the first virtual chess piece is displayed in the first virtual chessboard, but also the target virtual chess piece is displayed in the first virtual chessboard.

In some embodiments, the terminal displays the target virtual chess piece based on the chess piece information of the target virtual chess piece, so that the target virtual chess piece displayed on the first virtual chessboard can reflect a situation (the location, the level, the current attribute value, the chess piece equipment, etc.) of the target virtual chess piece in the corresponding second virtual chessboard. During the display of the target virtual chess piece by the terminal through the first virtual chessboard, the terminal further acquires chess piece adjustment data corresponding to the target virtual chess piece from the backend server according to a target frequency. Therefore, when the target opponent performs the adjusting operation on the target virtual chess piece, the terminal can synchronously update the chess piece information of the target virtual chess piece, so that the user may know an adjustment situation of the target virtual chess piece through the first virtual chessboard without going back and forth between the first virtual chessboard and the second virtual chessboard again, thereby improving human-machine interaction efficiency.

As shown in FIG. 3, when receiving the marking operation for the target virtual chess piece 304 in the second virtual chessboard 303, the terminal acquires the chess piece information of the target virtual chess piece 304. When receiving a triggering operation for a return control 305, the terminal switches the second virtual chessboard 303 to the first virtual chessboard 301, and displays the first virtual chess piece 302 and the target virtual chess piece 304 through the first virtual chessboard 301.

The target virtual chess piece displayed in the first virtual chessboard is not a virtual chess piece body, but a virtual shadow corresponding to the virtual chess piece, and its body is still displayed in the second virtual chessboard.

In summary, in the embodiment of this application, when receiving the marking operation for the target virtual chess piece in the second virtual chessboard, the terminal acquires its chess piece information and displays the target virtual chess piece based on the chess piece information after returning to the first virtual chessboard. Therefore, when going to the chessboards of other opponents to observe the layout of the chess piece at the preparation stage, the user may select important chess pieces in an opponent field based on the actual situation for marking. After returning to own first virtual chessboard, the user may observe the target virtual chess piece through the first virtual chessboard, and meanwhile adjust the first virtual chess piece within the first virtual chessboard without relying on memory for layout, which can avoid situations of affecting the layout of the virtual chess pieces due to the user memory error, or frequent operations and waste of preparation time due to multiple trips between the second virtual chessboard and the first virtual chessboard of each opponent, thereby improving preparation efficiency.

Figure 4:
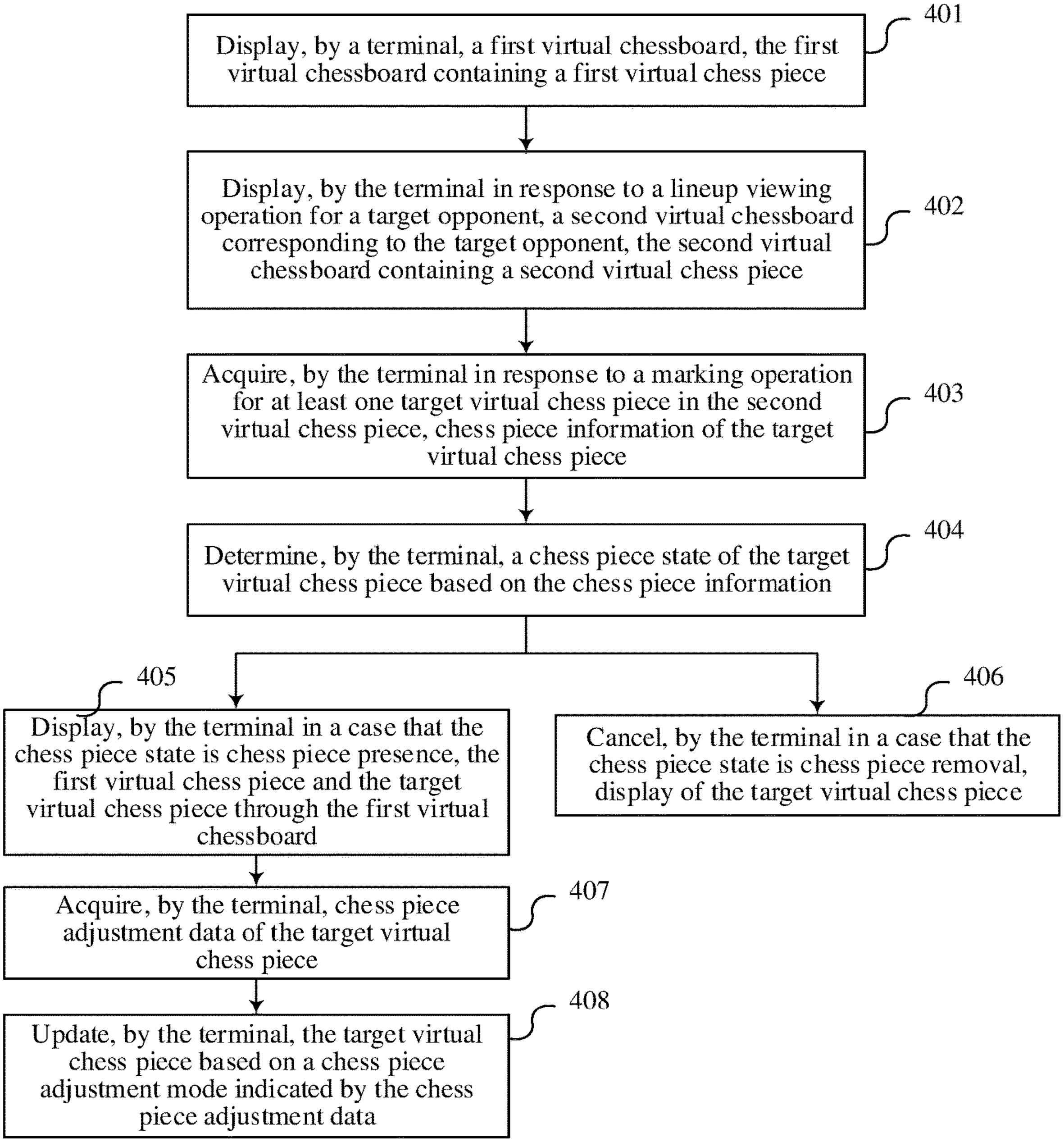
FIG. 4 is a flowchart of a display method for a virtual chessboard shown by another exemplary embodiment of this application.

In some embodiments, the terminal needs to acquire a chess piece state of the target virtual chess piece based on the chess piece information after returning to the first virtual chessboard and in a process of displaying the target virtual chess piece through the first virtual chessboard. When the chess piece state is chess piece presence, the terminal displays the target virtual chess piece. Otherwise, the display of the target virtual chess piece is canceled. FIG. 4 shows a flowchart of a display method for a virtual chessboard provided by another exemplary embodiment of this application. This embodiment takes application of this method to a terminal supporting a virtual environment as an example for illustration, and the method includes the following steps:

Step 401: Display, by a terminal, a first virtual chessboard, the first virtual chessboard containing a first virtual chess piece.

Step 402: Display, by the terminal in response to a lineup viewing operation for a target opponent, a second virtual chessboard corresponding to the target opponent, the second virtual chessboard containing a second virtual chess piece.

Step 403: Acquire, by the terminal in response to a marking operation for at least one target virtual chess piece in the second virtual chess piece, chess piece information of the target virtual chess piece.

The specific implementations of step 401 to step 403 may refer to step 201 to step 203 above, which is not repeated here in the embodiment of this application.

Step S404: Determine, by the terminal, a chess piece state of the target virtual chess piece based on the chess piece information.

Due to the fact that marking the target virtual chess piece and returning to the first virtual chessboard by the user are two independent operations, a time interval between the two operations is not fixed. When the user immediately returns to the first virtual chessboard after marking the target virtual chess piece, the interval time between the two operations is relatively short, during which the target virtual chess piece usually does not change (that is, the target opponent may not have had time to adjust the target virtual chess piece). When the user does not immediately return to the first virtual chessboard after marking the target virtual chess piece, but continues to observe the second virtual chessboard of the target opponent, or goes to second virtual chessboards of other opponents for observation, the interval time between marking the target virtual chess piece and returning to the first virtual chessboard is relatively long, during which the target opponent may have made adjustments to the target virtual chess piece, causing absence of the target virtual chess piece. Therefore, in order to avoid the target virtual chess piece displayed by the terminal being non-synchronous with the target virtual chess piece in the second virtual chessboard of the target opponent after the user returns to the first virtual chessboard, in step 403 above, the chess piece information acquired by the terminal contains chess piece identification of the target virtual chess piece and account identification of the target opponent. When receiving a return operation, the terminal acquires the chess piece state of the target virtual chess piece from a backend server based on the account identification and the chess piece identification. The chess piece state includes chess piece presence and chess piece absence. The terminal displays the first virtual chessboard based on the chess piece state. When the chess piece state is chess piece presence, the terminal executes step 405. When the chess piece state is chess piece absence, the terminal executes step 406.

When each opponent adjusts the virtual chess piece, the terminal sends corresponding chess piece adjustment data to the backend server based on an adjusting operation, and the backend server updates the chess piece state corresponding to each virtual chess piece based on the chess piece adjustment data. When receiving a chess piece addition operation sent by the terminal to indicate that a certain virtual chess piece is added to the virtual chessboard, the backend server determines that the chess piece state of the virtual chess piece is chess piece presence; and when receiving chess piece replacement, chess piece elimination, and other chess piece adjustment data sent by the terminal to indicate that a certain virtual chess piece is eliminated from the virtual chessboard, the backend server updates the chess piece state of the virtual chess piece from chess piece absence to chess piece presence.

Step 405: Display, by the terminal when the chess piece state is chess piece presence, the first virtual chess piece and the target virtual chess piece through the first virtual chessboard.

When it is determined that the chess piece state of the target virtual chess piece is chess piece presence, the terminal displays the target virtual chess piece through the first virtual chessboard.

In some embodiments, in order to avoid a situation that there are too many virtual chess pieces in the first virtual chessboard, resulting in confusion in display content and affecting user observation and layout, a marked chess piece upper limit is set in the terminal. The terminal displays the first virtual chessboard based on the marked chess piece upper limit and the quantity of the currently displayed target virtual chess pieces in the first virtual chessboard. Step 405 includes the following steps 405*a* to 405*c*.

Step 405*a*: Determine, by the terminal when the chess piece state is chess piece presence, a target chess piece location based on the chess piece information.

When it is determined that the chess piece state of the target virtual chess piece is chess piece presence, the terminal determines the target chess piece location based on the chess piece information. In some embodiments, the chess piece information acquired by the terminal upon receiving a marking operation for the target virtual chess piece contains the chess piece location, and when it is determined that the chess piece state is chess piece presence, the target chess piece location is directly determined based on the chess piece information; alternatively, the chess piece information acquired by the terminal contains the chess piece identification of the target virtual chess piece and the account identification of the target opponent. When sending the chess piece information to the backend server to request to acquire the chess piece state, the terminal acquires the chess piece location to ensure that the target chess piece location in the first virtual chessboard is synchronous with a location where the target virtual chess piece in the second virtual chessboard is located.

The chess piece location refers to a location (a checker) of the virtual chess piece in the corresponding virtual chessboard. In the chess lineup of the same opponent, only one virtual chess piece can be placed in one chess piece location. Due to the fact that in the embodiment of this application, the user may mark the virtual chess piece of at least one opponent, there may be a situation that the at least two target virtual chess pieces (of different opponents) are located at the same chess piece location when there are at least two target opponents. Therefore, the terminal needs to judge whether there are other virtual chess pieces present at the target chess piece location of the first virtual chessboard, so as to display the target virtual chess piece based on a judgment result.

Step 405*b*: Display, by the terminal when the virtual chess piece is not placed at the target chess piece location in the first virtual chessboard, the target virtual chess piece at the target chess piece location.

When other virtual chess pieces are not placed at the target chess piece location in the first virtual chessboard, the terminal may directly display the target virtual chess piece at the target chess piece location.

Step 405*c*: Display, by the terminal when the virtual chess piece has been placed at the target chess piece location in the first virtual chessboard, the first virtual chess piece and the target virtual chess piece through the first virtual chessboard based on the marked chess piece upper limit, the marked chess piece upper limit referring to a maximum value of the quantity of the virtual chess pieces simultaneously marked at the same chess piece location.

When other virtual chess pieces have been placed in the first virtual chessboard, the terminal needs to further judge whether the target virtual chess piece can be displayed at the target chess piece location. In order to avoid a situation that there are too many virtual chess pieces displayed at the same chess piece location, resulting in confusion in display content and affecting user observation and layout, the marked chess piece upper limit is set in the terminal. The marked chess piece upper limit refers to the maximum value of the quantity of the virtual chess pieces simultaneously marked at the same chess piece location. The terminal judges whether the target virtual chess piece can be displayed based on the marked chess piece upper limit and the quantity of the chess pieces already placed at the target chess piece location.

In some embodiments, when the quantity of the placed chess pieces at the target chess piece location does not reach the marked chess piece upper limit, step 405*c* includes step one to step three below.

Step one: Display, by the terminal when the virtual chess piece has been placed at the target chess piece location in the first virtual chessboard and the quantity of the placed chess pieces does not reach the marked chess piece upper limit, the first virtual chess piece and the target virtual chess piece through the first virtual chessboard.

When the quantity of the placed chess pieces at the target chess piece location does not reach the marked chess piece upper limit, the terminal hides the virtual chess pieces (i.e. the virtual chess pieces marked by the user before this) displayed at the target chess piece location in the first virtual chessboard, and displays the target virtual chess piece (i.e. the virtual chess piece marked in this operation) at the target chess piece location.

For example, the marked chess piece upper limit is 3, which means that a maximum of three target virtual chess pieces can be supported to be placed at the same chess piece location. When returning to the first virtual chessboard, the terminal acquires the quantity of the placed chess pieces at the target chess piece location, and obtains that the quantity of the placed chess pieces is 1 and does not reach the marked chess piece upper limit, and thus the terminal displays the target virtual chess piece at the target chess piece location and hides the virtual chess piece previously placed at the target chess piece location.

Step two: Display, by the terminal, chess piece identification of other virtual chess pieces at the target chess piece location on a peripheral side of the target chess piece location.

After the terminal displays the target virtual chess piece at the target chess piece location, other virtual chess pieces at this location are hidden. By displaying the chess piece identification (such as a thumbnail and a chess piece name) of the hidden virtual chess piece at the location on the peripheral side of the target chess piece location, the terminal helps the user to understand a chess piece marking situation of each chess piece location, and prompts the user that there are other marked second virtual chess pieces at this location. Optionally, the peripheral side of the target chess piece location refers to a circular area or polygonal area centered on the target chess piece location.

In the above process, when at least two virtual chess pieces are placed at the target chess piece location, the terminal defaults to displaying the most recently marked target virtual chess piece. In one embodiment, before displaying the target virtual chess piece, when the terminal determines that other virtual chess pieces have been placed at the target chess piece location, a chess piece selection pop-up window is displayed, for allowing the user to manually select the virtual chess piece to be displayed first.

After the terminal displays the target virtual chess piece and hides other virtual chess pieces at the target chess piece location, the display method for the virtual chessboard provided in the embodiment of this application further includes the following step three.

Step three: Switch, by the terminal in response to a triggering operation for target chess piece identification in the chess piece identification, the target virtual chess piece displayed at the target chess piece location into a virtual chess piece corresponding to the target chess piece identification.

In some embodiments, the chess piece identification corresponding to the hidden chess piece is displayed as a triggerable UI control. When wanting to view the hidden virtual chess piece, the user may trigger its corresponding chess piece identification to enable the terminal to switch the chess pieces. The terminal switches the target virtual chess piece displayed at the target chess piece location into the virtual chess piece corresponding to the target chess piece identification.

Figure 5:
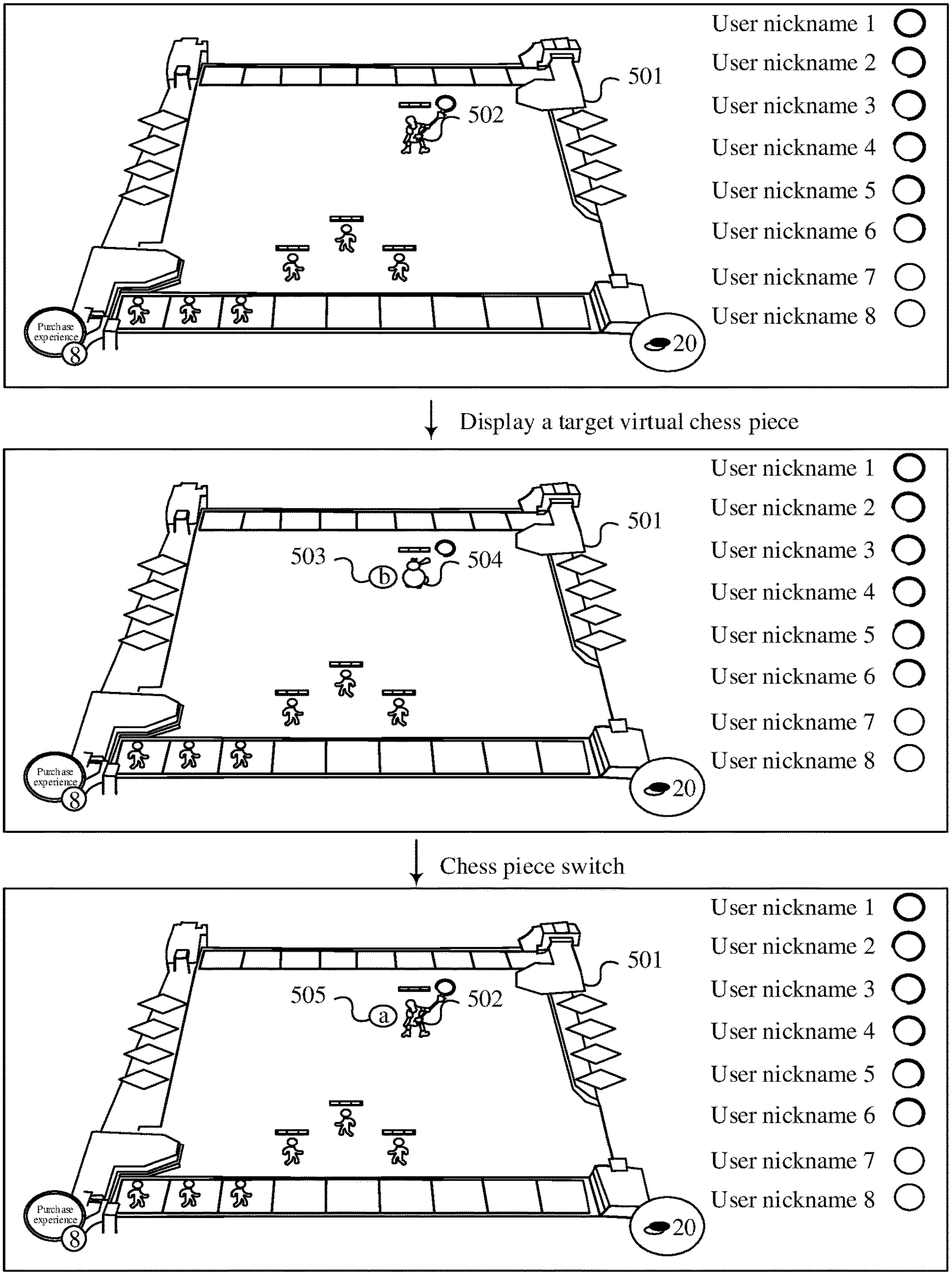
FIG. 5 is a schematic diagram of a process of displaying a target virtual chess piece shown by an exemplary embodiment of this application.

For example, as shown in FIG. 5, the virtual chess piece 502 is displayed at the target chess piece location of the first virtual chessboard 501, and the terminal determines that the chess piece location of the target virtual chess piece 504 is also located at the target chess piece location, and the marked chess piece upper limit is 3. The terminal displays the target virtual chess piece 504 at the target chess piece location, and displays the chess piece identification 503 corresponding to the virtual chess piece 502 on the peripheral side of this location. When a triggering operation for the chess piece identification 503 is received and the chess piece locations of the virtual chess piece 502 and the target virtual chess piece 504 are not changed, the terminal displays the virtual chess piece 502 at the target chess piece location, and displays the chess piece identification 505 corresponding to the target virtual chess piece 504 on the peripheral side.

In some embodiments, when the quantity of the placed chess pieces at the target chess piece location reaches the marked chess piece upper limit, step 405*c* includes step four to step six below.

Step four: Display, by the terminal, a first prompt pop-up window when the virtual chess piece has been placed at the target chess piece location in the first virtual checkerboard and the quantity of the placed chess pieces reaches the marked chess piece upper limit.

The terminal displays the first prompt pop-up window when the quantity of the placed chess pieces at the target chess piece location in the first virtual chessboard reaches the marked chess piece upper limit. The first prompt pop-up window contains prompt information for reminding the user that the virtual chess piece placed at the target chess piece location corresponding to the target virtual chess piece has reached the upper limit.

For example, in the first virtual chessboard, only one marked second virtual chess piece can be placed at the same chess piece location. When the terminal determines that the virtual chess piece has been placed at the target chess piece location, the terminal displays the first prompt pop-up window.

Step five: Cancel, by the terminal in response to a triggering operation for a chess piece replacement control in the first prompt pop-up window, display of the at least one virtual chess piece at the target chess piece location.

Due to the fact that the marked second virtual chess pieces are all important virtual chess pieces confirmed by the user, in order to facilitate the user's selection of the virtual chess pieces retained at the target chess piece location based on demand, the first prompt pop-up window further displays a chess piece replacement control and a marking cancellation control. When receiving the triggering operation for the chess piece replacement control, the terminal displays the target virtual chess piece at the target chess piece location, determines at least one virtual chess piece from other placed virtual chess pieces, and cancels its display (i.e. canceling the marking of at least one virtual chess piece at the target chess piece location).

Optionally, the terminal cancels the display of the virtual chess piece that receives the earliest marking operation at the target chess piece location, or cancels the display of any virtual chess piece at the target chess piece location, or cancels the display of the virtual chess piece manually selected by the user, which is not limited in the embodiment of this application.

Step six: Display, by the terminal, the first virtual chess piece and the target virtual chess piece through the first virtual chessboard.

Figure 6:
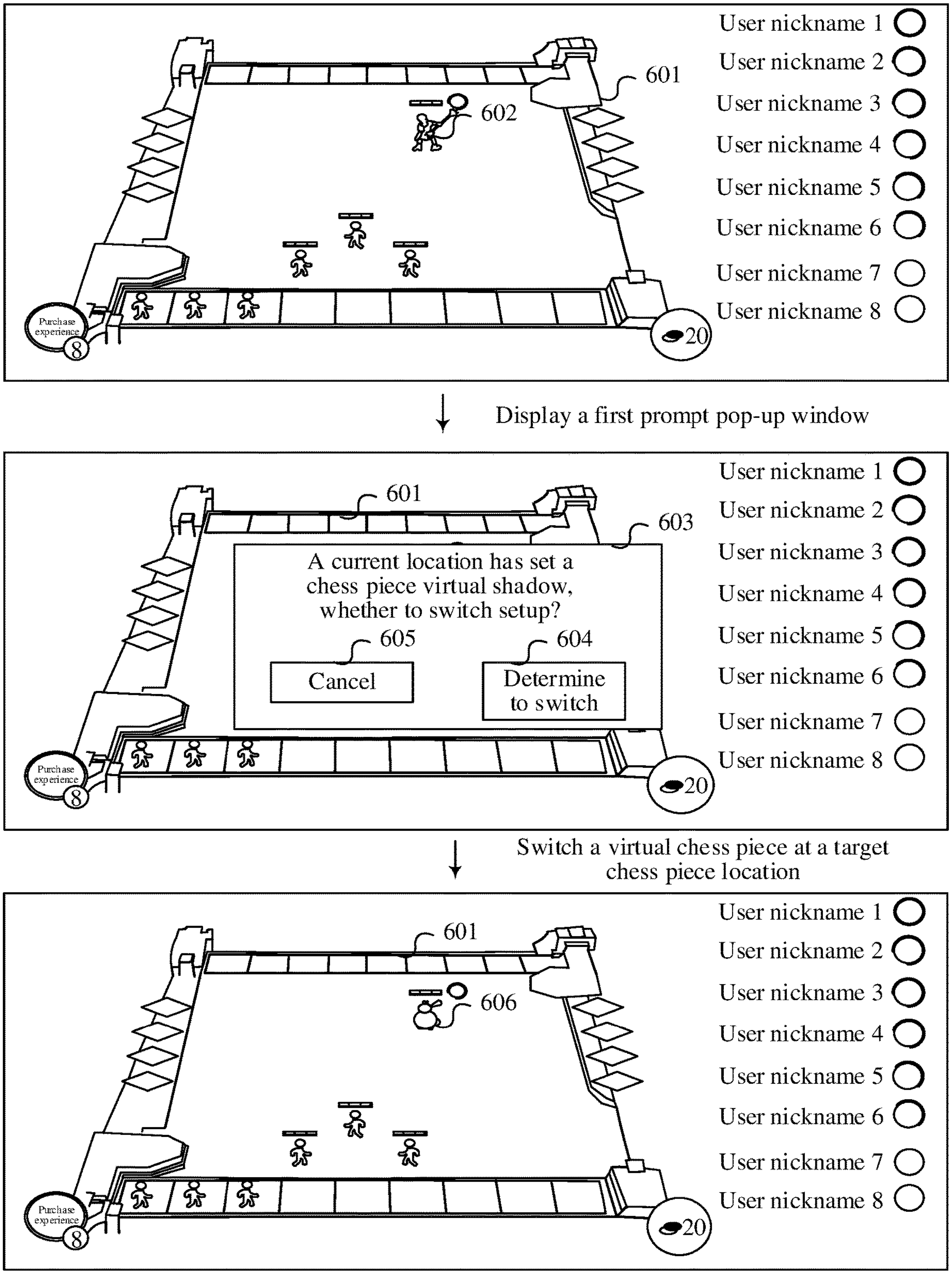
FIG. 6 is a schematic diagram of a process of switching a target virtual chess piece shown by an exemplary embodiment of this application.

For example, as shown in FIG. 6, the marked virtual chess piece 602 is displayed at the target chess piece location of the first virtual chessboard 601, the marked chess piece upper limit is 1, and therefore, the terminal displays the first prompt pop-up window 603. When receiving the triggering operation for the chess piece replacement control 604 in the first prompt pop-up window 603, the terminal cancels the display of the virtual chess piece 602 (cancels the marking of the virtual chess piece 602) and displays the target virtual chess piece 606 at the target chess piece location.

After step four, the method provided in the embodiment of this application further includes step seven below.

Step seven: Cancel, by the terminal in response to a triggering operation for the marking cancellation control in the first prompt pop-up window, the display of the target virtual chess piece.

In a case of receiving the triggering operation for the marking cancellation control in the first prompt pop-up window, the terminal cancels the display of the target virtual chess piece, that is, the terminal cancels the marking of the target virtual chess piece.

As shown in FIG. 6, in a case of receiving the triggering operation of the user for the marking cancellation control 605, the terminal cancels the display of the target virtual chess piece 606 and still displays the virtual chess piece 602 at the target chess piece location.

Step 406, Cancel, by the terminal when the chess piece state is chess piece removal, display of the target virtual chess piece.

When returning to the first virtual chessboard and determining that the chess piece state of the target virtual chess piece is chess piece removal (chess piece absence), the terminal directly stops displaying the target virtual chess piece.

In some embodiments, after successfully displaying the target virtual chess piece, the terminal still acquires the chess piece state of each target virtual chess piece in the first virtual chessboard according to target frequency. When it is determined that there is a target virtual chess piece that does not exist in the field, the terminal stops displaying the target virtual chess piece. Step 406 includes the following step 406*a*.

Step 406*a*: Cancel, by the terminal when the chess piece state is chess piece removal, display of the target virtual chess piece according to a target display effect.

The target display effect includes at least one of gradual changing to disappearance, flickering and disappearing, and displaying marking stop prompt information on a peripheral side of the target virtual chess piece corresponding to the chess piece identification.

During the display of the target virtual chess piece by the terminal through the first virtual chessboard, the target opponent may remove the target virtual chess piece (for example, withdrawing the target virtual chess piece from the layout and placing it in a backup chess piece queue, or selling the target virtual chess piece or exchanging it for other virtual chess pieces by the user), resulting in the chess piece state of the target virtual chess piece being absence. Therefore, the terminal cancels the display of the target virtual chess piece.

Optionally, in order to remind the user that there is currently the target virtual chess piece with the chess piece state being absence, and to avoid directly stopping the display of the target virtual chess piece by the user unwittingly which may cause the user to miss important information, the terminal cancels the display of the target virtual chess piece according to the target display effect.

Optionally, when the terminal determines that the chess piece state of the target virtual chess piece previously displayed in the first virtual chessboard is chess piece removal during the display of the second virtual chessboard, the terminal may cancel the display of the target virtual chess piece according to the target display effect upon receiving the return operation.

In some embodiments, in a process that the terminal displays the target virtual chess piece through the first virtual chessboard, the target opponent may replace the target virtual chess piece with a candidate virtual chess piece that is more beneficial to the target opponent. In this case, the candidate virtual chess piece is also usually an important virtual chess piece in a camp of the target opponent, that is, the user may have a need to mark the candidate virtual chess piece. In order to further simplify the user operation and improve preparation efficiency, step 406 includes the step 406*b* to step 406*c* below.

Step 406*b*: Display, by the terminal when the chess piece state is chess piece removal and the target opponent replaces the target virtual chess piece with the candidate virtual chess piece, a second prompt pop-up window.

The second prompt pop-up window contains prompt information for indicating that the target virtual chess piece is replaced, the candidate virtual chess piece and the target virtual chess piece have a same bond, a chess piece level of the candidate virtual chess piece is higher than a chess piece level of the target virtual chess piece, and/or the candidate virtual chess piece inherits chess piece equipment of the target virtual chess piece. The chess piece level does not refer to a match experience level (such as a star level), but is related to the amount of virtual resources consumed by exchanging the virtual chess pieces. A chess piece level of a low-consumption chess piece is lower than that of a high-consumption chess piece. For example, a chess piece level of a virtual chess piece that needs to be exchanged by spending 1 virtual gold coin is lower than a chess piece level of a virtual chess piece that needs to be exchanged by spending 2 virtual gold coins.

Step 406*c*: Replace, by the terminal in response to the triggering operation for the chess piece replacement control in the second prompt pop-up window, the target virtual chess piece in the first virtual chessboard with the candidate virtual chess piece based on the chess piece information of the candidate virtual chess piece.

In order to facilitate that there is no need for the user to trigger to go to the second virtual chessboard of the corresponding target opponent for marking setup in a case of determining the need to mark the candidate virtual chess piece, after determining that the target opponent replaces the target virtual chess piece with the candidate virtual chess piece, the terminal displays the second prompt pop-up window. The second prompt pop-up window contains prompt information for indicating that the target virtual chess piece is replaced, and the chess piece replacement control. The user may achieve chess piece replacement with one click within the first virtual chessboard by triggering the chess piece replacement control.

In some embodiments, in a case of receiving the triggering operation for a replacement cancellation control in the second prompt pop-up window, the terminal cancels the display of the target virtual chess piece, and the terminal no longer acquires the chess piece information of the candidate virtual chess piece.

Figure 7:
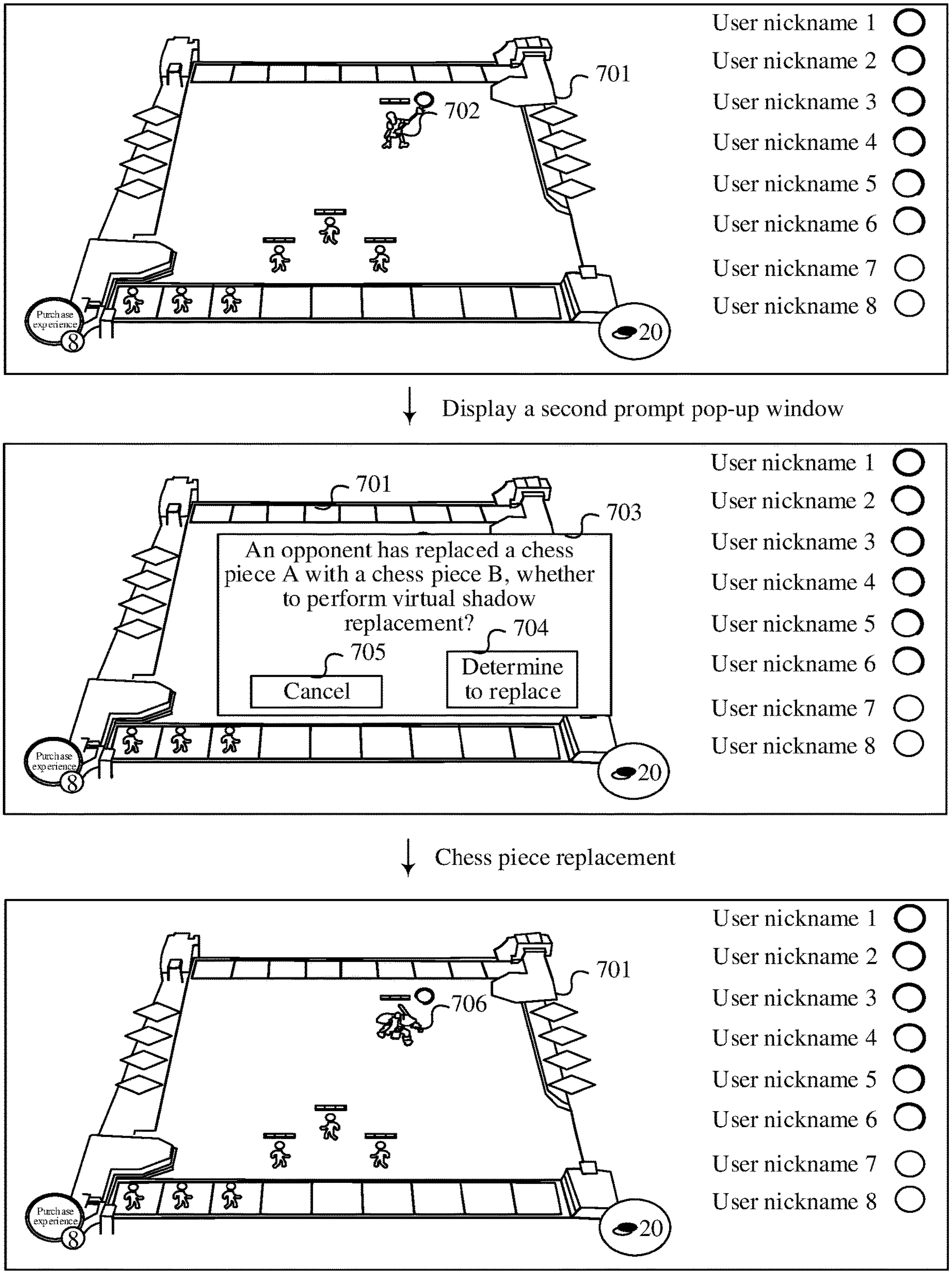
FIG. 7 is a schematic diagram of a process of replacing a target virtual chess piece shown by an exemplary embodiment of this application.

For example, as shown in FIG. 7, the target virtual chess piece 702 is displayed in the first virtual chessboard 701. If the terminal determines that the target opponent removes the target virtual chess piece 702 and places the candidate virtual chess pieces 706 at the same location, the second prompt pop-up window 703 is displayed. When receiving the triggering operation for the chess piece replacement control 704 in the second prompt pop-up window 703, the terminal replaces the target virtual chess piece 702 in the first virtual chessboard 701 with the candidate virtual chess piece 706. If receiving the triggering operation for the replacement cancellation control 705 in the second prompt pop-up window 703, the terminal cancels the display of the target virtual chess piece 702.

Step 407: Acquire, by the terminal, chess piece adjustment data of the target virtual chess piece.

In some embodiments, during the display of the target virtual chess piece by the terminal through the first virtual chessboard, the target opponent may adjust the target virtual chess piece, such as moving the chess piece location of the target virtual chess piece, upgrading of target virtual chess piece, and replacing or adding the chess piece equipment of the target virtual chess piece. The terminal acquires the chess piece adjustment data of the target virtual chess piece according to the target frequency to achieve synchronous updating of the target virtual chess piece, facilitating the user to observe the adjustment operation of the target opponent for the target virtual chess piece through the first virtual chessboard, thereby timely adjusting the layout and improving the human-machine interaction efficiency.

Step 408: Update, by the terminal, the target virtual chess piece based on a chess piece adjustment mode indicated by the chess piece adjustment data.

The chess piece adjustment mode includes at least one of chess piece location adjustment, chess piece level adjustment, and chess piece equipment adjustment.

Figure 8:
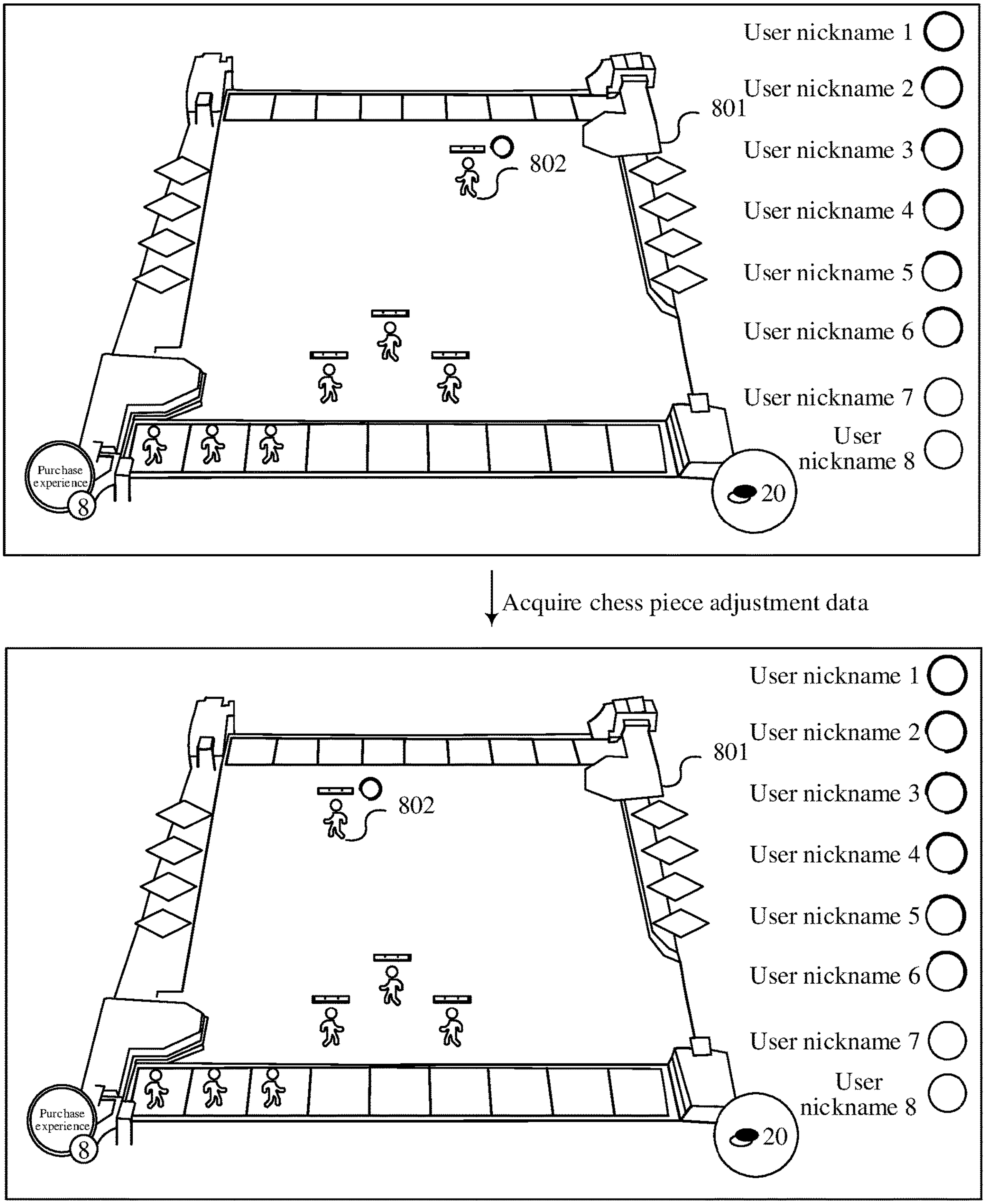
FIG. 8 is a schematic diagram of a process of updating a target virtual chess piece shown by an exemplary embodiment of this application.

For example, as shown in FIG. 8, the target virtual chess piece 802 is displayed in the first virtual chessboard 801. The terminal acquires the chess piece adjustment data corresponding to the target virtual chess piece 802, and the chess piece adjustment data indicate that the chess piece location of the target virtual chess piece 802 moves from a first location to a second location, thus the terminal moves, based on the chess piece adjustment data, the target virtual chess piece 802 displayed at the first location to the second location within the first virtual chessboard 801 for displaying.

In the embodiment of this application, marking the second virtual chess piece of at least one target opponent is supported. When at least two target virtual chess pieces are placed at the same target chess piece location, the terminal displays the chess piece identification of one of the target virtual chess pieces and other virtual chess pieces. The user may switch the display by triggering the chess piece identification, so that the user synchronously observes important chess pieces of the plurality of opponents within the first virtual chessboard, there is no need to switch for multiple times between the second virtual chessboard of each opponent and own first virtual chessboard, thereby further simplifying the step for the user to mark virtual chess piece, and improving the preparation efficiency and human-machine interaction efficiency. In the process of displaying the target virtual chess pieces through the first virtual chessboard, the chess piece adjustment data are acquired, and the target virtual chess piece is updated based on the chess piece adjustment data, so as to achieve synchronous display of the adjustment operation for the target opponent, and improve the display efficiency of the terminal, thereby improving the human-machine interaction efficiency.

Figure 9:
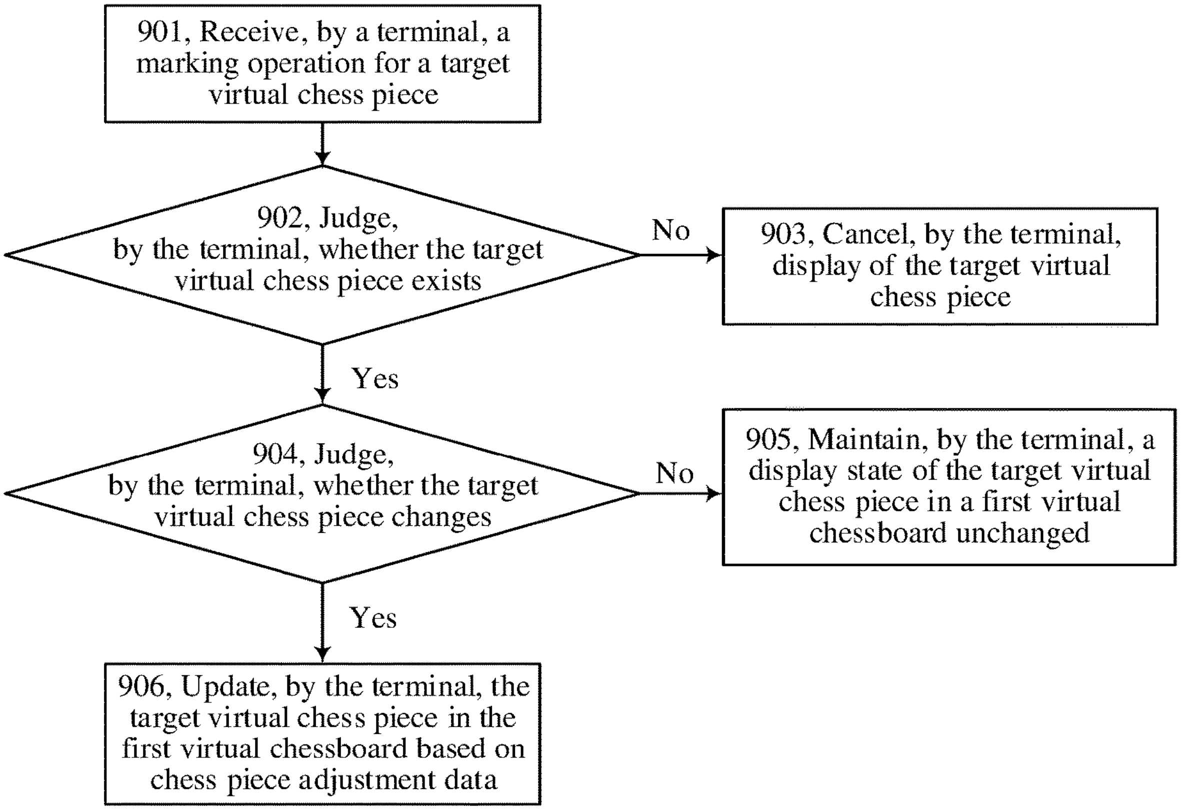
FIG. 9 is a flowchart of a display method for a virtual chessboard shown by another exemplary embodiment of this application.

In combination with the above embodiment, in a schematic example, a flow of the terminal executing a virtual chess piece marking task is shown in FIG. 9, and the flow includes the following steps:

Step 901: Receive, by the terminal, the marking operation for the target virtual chess piece.

Step 902: Judge, by the terminal, whether the target virtual chess piece exists; if yes, execute step 904; and if no, execute step 903.

Step 903: Cancel, by the terminal, the display of the target virtual chess piece.

Step 904: Judge, by the terminal, whether the target virtual chess piece changes; if yes, execute step 906; and if no, execute step 905.

Step 905: Maintain, by the terminal, a display state of the target virtual chess piece in the first virtual chessboard unchanged.

Step 906: Update, by the terminal, the target virtual chess piece in the first virtual chessboard based on the chess piece adjustment data.

Figure 10:
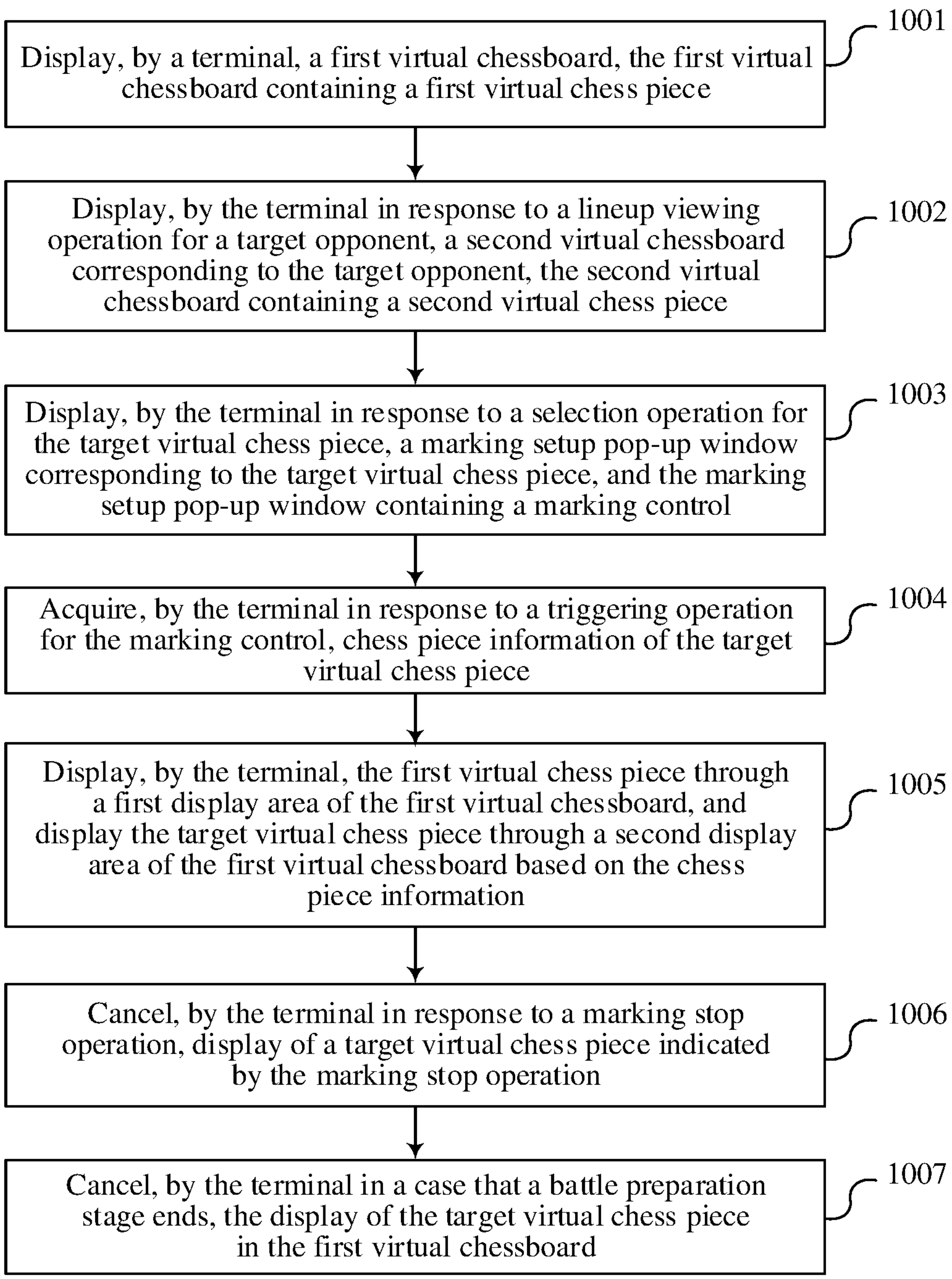
FIG. 10 is a flowchart of a display method for a virtual chessboard shown by another exemplary embodiment of this application.

In order to facilitate the user to distinguish the first virtual chess piece from the target virtual chess piece in the first virtual chessboard, and to avoid confusion to the user caused by a large number of virtual chess pieces, the terminal adopts different display modes in different display areas to display the first virtual chess piece and the target virtual chess piece. FIG. 10 shows a flowchart of a display method for a virtual chessboard provided by another exemplary embodiment of this application. This embodiment takes application of this method to a terminal supporting a virtual environment as an example for illustration, and the method includes the following steps:

Step 1001: Display, by a terminal, a first virtual chessboard, the first virtual chessboard containing a first virtual chess piece.

Step 1002: Display, by the terminal in response to a lineup viewing operation for a target opponent, a second virtual chessboard corresponding to the target opponent, the second virtual chessboard containing a second virtual chess piece.

The implementations of step 1001 to step 1002 may refer to step 201 to step 202 above, which is not repeated here in the embodiment of this application.

Step 1003: Display, by the terminal in response to a selection operation for the target virtual chess piece, a marking setup pop-up window corresponding to the target virtual chess piece, and the marking setup pop-up window containing a marking control.

In some embodiments, the user may actively select the second virtual chess piece that needs to be marked. When receiving a selection operation (for example, a triggering operation for a chess piece model corresponding to the target virtual chess piece) for the target virtual chess piece in the second virtual chess piece, the terminal displays a marking setup pop-up window corresponding to the target virtual chess piece. The user may acquire the chess piece information of the target virtual chess piece and a setup mark from the marking setup pop-up window.

Figure 11:
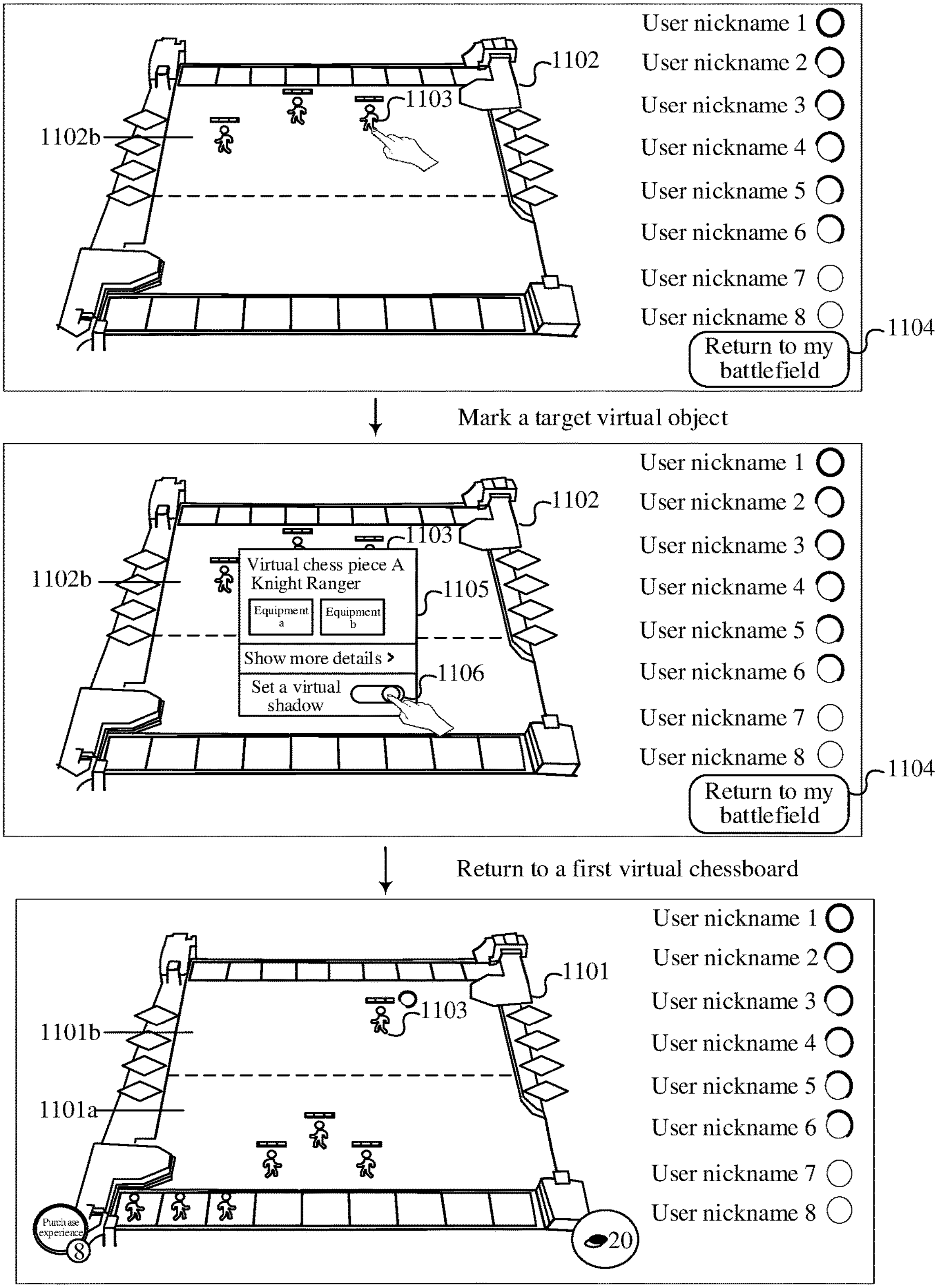
FIG. 11 is a schematic diagram of a process of performing a marking operation on a target virtual chess piece shown by an exemplary embodiment of this application.

For example, as shown in FIG. 11, when receiving the selection operation for the target virtual chess piece 1103 in the second virtual chessboard 1102, the terminal displays the marking setup pop-up window 1105 corresponding to the target virtual chess piece 1103. The marking setup pop-up window 1105 contains chess piece information such as a chess piece name, a chess piece type and chess piece equipment of the target virtual chess piece 1103, and further contains a marking control 1106.

Step 1004: Acquire, by the terminal in response to a triggering operation for the marking control, chess piece information of the target virtual chess piece.

When receiving the triggering operation for the marking control, the terminal determines to receive the marking operation for the target virtual chess piece, and acquires the chess piece information of the target virtual chess piece.

Step 1005: Display, by the terminal, the first virtual chess piece through a first display area of the first virtual chessboard, and display the target virtual chess piece through a second display area of the first virtual chessboard based on the chess piece information.

In some embodiments, a virtual chessboard at a preparation stage corresponds to a virtual chessboard at a match stage, the virtual chessboard contains the first display area and the second display area, the first virtual chess piece is located within the first display area of the first virtual chessboard, and the second virtual chess piece is located within the second display area of the second virtual chessboard.

The first virtual chess piece and the target virtual chess piece are displayed in different display areas of the first virtual chessboard. On the one hand, an arrangement mode of the chess pieces at a battle stage can be simulated, facilitating the user to think about a layout strategy. On the other hand, it can help the user distinguish the first virtual chess piece from the target virtual chess piece, avoiding confusion.

As shown in FIG. 11, the second virtual chess pieces are all displayed in the second display area 1102*b* of the second virtual chessboard 1102. After receiving the marking operation for the target virtual chess piece 1103 and the triggering operation for the return control 1104, the terminal displays the first virtual chessboard 1101, displays the first virtual chess piece in the first display area 1101*a* of the first virtual chessboard 1101, and displays the target virtual chess piece 1103 in the second display area 1101*b*.

In order to further distinguish the first virtual chess piece from the target virtual chess piece, in some embodiments, a display mode of the first virtual chess piece in the first virtual chessboard is different from a display mode of the target virtual chess piece. A difference in the display modes between the first virtual chess piece and the target virtual chess piece includes at least one of the following: a chess piece orientation of the first virtual chess piece is different from a chess piece orientation of the target virtual chess piece (for example, the first virtual chess piece is placed opposite to the target virtual chess piece, and its orientation corresponds to an attack direction at the battle stage); transparency of the first virtual chess piece is different from transparency of the target virtual chess piece (for example, the transparency of the first virtual chess piece is 0, and the target virtual chess piece is a virtual shadow of the corresponding second virtual chess piece, with the transparency of 50%); an attribute bar color of the first virtual chess piece is different from an attribute bar color of the target virtual chess piece; the target virtual chess piece is highlighted (for example, a peripheral side of the target virtual chess piece is highlighted, or a special colored mark is displayed below the target virtual chess piece, etc.); and account identification of a belonged opponent is displayed on the peripheral side of the target virtual chess piece (for example, a user avatar of the opponent is displayed above the target virtual chess piece).

Step 1006: Cancel, by the terminal in response to a marking stop operation, display of a target virtual chess piece indicated by the marking stop operation.

In some embodiments, if the user determines that there is no need to continue displaying a certain target virtual chess piece in the first virtual chessboard, the terminal may stop displaying the target virtual chess piece through the marking stop operation.

For example, when receiving a selection operation for the target virtual chess piece in the first virtual chessboard, the terminal displays the marking cancellation pop-up window, and the marking cancellation pop-up window contains a marking cancellation control. When receiving the triggering operation for the marking cancellation control, the terminal stops the display of the target virtual chess piece. A marking clearing control is further displayed in a virtual chessboard interface corresponding to the first virtual chessboard, and when receiving the triggering operation for the marking cancellation control, the terminal stops the display of all the target virtual chess pieces in the first virtual chessboard.

Step 1007: Cancel, by the terminal when a battle preparation stage ends, the display of the target virtual chess piece in the first virtual chessboard.

In some embodiments, the user may mark the second virtual chess piece at the battle preparation stage. When the match preparation stage ends and the match stage begins, the terminal automatically stops the display of the target virtual chess piece in the first virtual chessboard.

Optionally, when canceling the display of the target virtual chess piece due to the end of the battle preparation stage, the terminal retains the marking of the target virtual chess piece, and judges, at the beginning of the next battle preparation stage, whether the target virtual chess piece in the previous battle preparation stage exists. If existing, the target virtual chess piece is displayed through the first virtual chessboard. Alternatively, after the end of the battle preparation stage, the terminal clears the marking of all the target virtual chess pieces.

In the embodiment of this application, the user may trigger the selection of the target virtual chess piece in the second virtual chessboard, mark an individual virtual chess piece, and display it on the first virtual chessboard. The user may transfer an important virtual object that has a significant impact on own layout to the first virtual chessboard for display according to own needs, so that the user can adjust the layout while observing the target virtual object, thereby simplifying the match preparation process, improving the efficiency of match preparation, and further improving the human-machine interaction efficiency.

Figure 12:
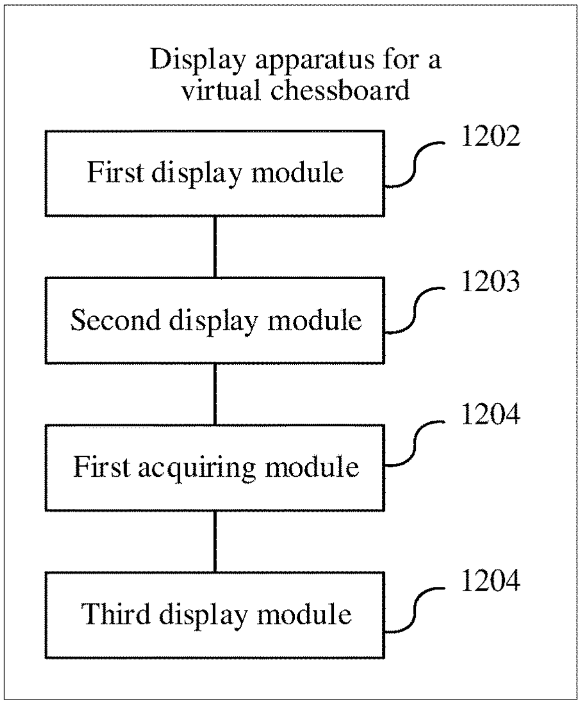
FIG. 12 is a structural block diagram of a display apparatus for a virtual chessboard shown by an exemplary embodiment of this application.

FIG. 12 is a structural block diagram of a display apparatus for a virtual chessboard provided by an exemplary embodiment of this application. The composition of the apparatus is as follows:

- a first display module 1201, configured to display a first virtual chessboard, the first virtual chessboard containing a first virtual chess piece;
- a second display module 1202, configured to display, in response to a lineup viewing operation for a target opponent, a second virtual chessboard corresponding to the target opponent, the second virtual chessboard containing a second virtual chess piece;

a first acquiring module 1203, configured to acquire, in response to a marking operation for at least one target virtual chess piece in the second virtual chess piece, chess piece information of the target virtual chess piece; and a third display module 1204, configured to display, based on the chess piece information, the first virtual chess piece and the target virtual chess piece through the first virtual chessboard.

Optionally, the third display module 1204 includes:

a first determining unit, configured to determine a chess piece state of the target virtual chess piece based on the chess piece information; and a first display unit, configured to display, when the chess piece state is chess piece presence, the first virtual chess piece and the target virtual chess piece through the first virtual chessboard.

The apparatus further includes:

a first control module, configured to cancel, when the chess piece state is chess piece removal, display of the target virtual chess piece.

Optionally, the first display unit is further configured to:

determine, when the chess piece state is chess piece presence, a target chess piece location based on the chess piece information;

display, when the virtual chess piece is not placed at the target chess piece location in the first virtual chessboard, the target virtual chess piece at the target chess piece location; and display, when the virtual chess piece has been placed at the target chess piece location in the first virtual chessboard, the first virtual chess piece and the target virtual chess piece through the first virtual chessboard based on a marked chess piece upper limit, the marked chess piece upper limit referring to a maximum value of the quantity of the virtual chess pieces simultaneously marked at the same chess piece location.

Optionally, the first display unit is further configured to:

display, when the virtual chess piece has been placed at the target chess piece location in the first virtual chessboard and the quantity of the placed chess pieces does not reach the marked chess piece upper limit, the first virtual chess piece and the target virtual chess piece through the first virtual chessboard; and display chess piece identification of other virtual chess pieces at the target chess piece location on a peripheral side of the target chess piece location.

The apparatus further includes:

a second control module, configured to switch, in response to a triggering operation for target chess piece identification in the chess piece identification, the target virtual chess piece displayed at the target chess piece location into a virtual chess piece corresponding to the target chess piece identification.

Optionally, the first display unit is further configured to:

display a first prompt pop-up window when the virtual chess piece has been placed at the target chess piece location in the first virtual chessboard and the quantity of the placed chess pieces reaches the marked chess piece upper limit;

stop, in response to a triggering operation for a chess piece replacement control in the first prompt pop-up window, display of the at least one virtual chess piece at the target chess piece location; and display the first virtual chess piece and the target virtual chess piece through the first virtual chessboard.

The apparatus further includes:

a third control module, configured to stop, in response to a triggering operation for a marking cancellation control in the first prompt pop-up window, the display of the target virtual chess piece.

Optionally, the apparatus further includes:

a second acquiring module, configured to acquire chess piece adjustment data of the target virtual chess piece; and an updating module, configured to update the target virtual chess piece based on a chess piece adjustment mode indicated by the chess piece adjustment data, the chess piece adjustment mode including at least one of chess piece location adjustment, chess piece level adjustment, and chess piece equipment adjustment.

Optionally, the first control module includes:

a control unit, configured to cancel, when the chess piece state is chess piece removal, display of the target virtual chess piece according to a target display effect, the target display effect including at least one of gradual changing to disappearance, flickering and disappearing, and displaying marking cancellation prompt information on a peripheral side of the target virtual chess piece.

Optionally, the control unit is further configured to:

display, when the chess piece state is chess piece removal and the target opponent replaces the target virtual chess piece with a candidate virtual chess piece, a second prompt pop-up window, the second prompt pop-up window containing prompt information for indicating that the target virtual chess piece is replaced, the candidate virtual chess piece and the target virtual chess piece having a same bond, a chess piece level of the candidate virtual chess piece being higher than a chess piece level of the target virtual chess piece, and/or the candidate virtual chess piece inheriting chess piece equipment of the target virtual chess piece; and replace, in response to the triggering operation for a chess piece replacement control in the second prompt pop-up window, the target virtual chess piece in the first virtual chessboard with the candidate virtual chess piece based on the chess piece information of the candidate virtual chess piece.

Optionally, a display mode of the first virtual chess piece in the first virtual chessboard is different from a display mode of the target virtual chess piece.

A difference in the display modes between the first virtual chess piece and the target virtual chess piece includes at least one of the following:

a chess piece orientation of the first virtual chess piece is different from a chess piece orientation of the target virtual chess piece;

transparency of the first virtual chess piece is different from transparency of the target virtual chess piece; and an attribute bar color of the first virtual chess piece is different from an attribute bar color of the target virtual chess piece;

the target virtual chess piece is highlighted; and account identification of a belonged opponent is displayed on a peripheral side of the target virtual chess piece.

Optionally, the virtual chessboard contains a first display area and a second display area, the first virtual chess piece is located within the first display area of the first virtual chessboard, and the second virtual chess piece is located within the second display area of the second virtual chessboard; and the third display module 1204 includes:

a second display unit, configured to display the first virtual chess piece through the first display area of the first virtual chessboard, and display the target virtual chess piece through the second display area of the first virtual chessboard based on the chess piece information.

Optionally, the first acquiring module 1203 includes:

a third display unit, configured to display, in response to a selection operation for the target virtual chess piece, a marking setup pop-up window corresponding to the target virtual chess piece, and the marking setup pop-up window containing a marking control; and an acquiring unit, configured to acquire, in response to a triggering operation for the marking control, the chess piece information of the target virtual chess piece.

Optionally, the apparatus further includes:

a fourth control module, configured to cancel, in response to a marking stop operation, display of a target virtual chess piece indicated by the marking stop operation; and a fifth control module, configured to cancel, when a battle preparation stage ends, the display of the target virtual chess piece in the first virtual chessboard.

In summary, in the embodiment of this application, when receiving the marking operation for the target virtual chess piece in the second virtual chessboard, the chess piece information is acquired, and the target virtual chess piece is displayed based on the chess piece information after returning to the first virtual chessboard. Therefore, when going to other opponent chessboards to observe the chess piece layout at the preparation stage, the user may select the important chess piece in the opponent field for marking according to the actual situation. After returning to own first virtual chessboard, the user may observe the target virtual chess piece through the first virtual chessboard, and meanwhile adjust the first virtual chess piece within the first virtual chessboard without relying on memory for layout, which can avoid situations of affecting the layout of the virtual chess pieces due to the user memory error, or frequent operations and waste of preparation time due to multiple trips between the second virtual chessboard and the first virtual chessboard of each opponent, thereby improving the preparation efficiency and the human-machine interaction efficiency.

Figure 13:
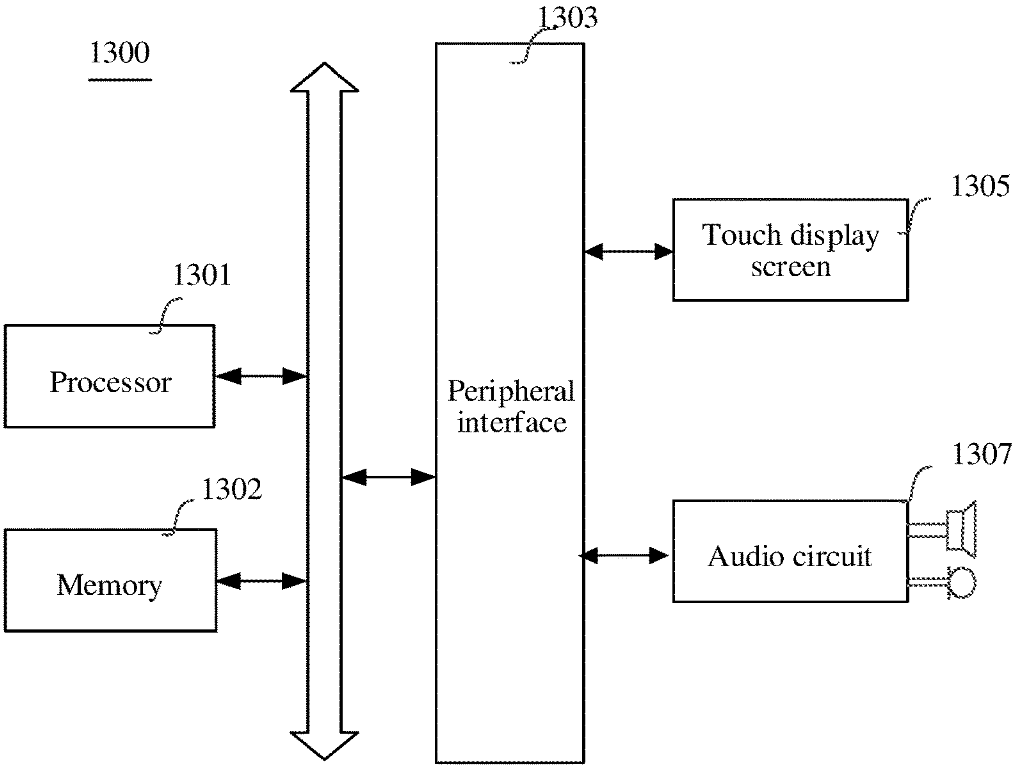
FIG. 13 is a structural block diagram of a terminal shown by an exemplary embodiment of this application.

FIG. 13 is a structural block diagram of a terminal 1300 provided by an exemplary embodiment of this application. The terminal 1300 may be a portable mobile terminal, such as: a smartphone, a tablet computer, a moving picture experts group audio layer III (MP3) player, and a moving picture experts group audio layer IV (MP4) player. The terminal 1300 may further be referred to as user equipment, a portable terminal, or other names.

Generally, the terminal 1300 includes: a processor 1301 and a memory 1302.

The processor 1301 may include one or more processing cores, for example, a 4-core processor or an 8-core processor. The processor 1301 may be implemented in at least one hardware form of digital signal processing (DSP), a field-programmable gate array (FPGA), and a programmable logic array (PLA). The processor 1301 may also include a main processor and a coprocessor. The main processor is a processor used for processing data in an awake state, and is also referred to as a central processing unit (CPU). The coprocessor is a low-power-consumption processor used for processing data in a standby state. In some embodiments, the processor 1301 may be integrated with a graphics processing unit (GPU). The GPU is used for rendering and drawing content that needs to be displayed on a display screen. In some embodiments, the processor 1301 may further include an artificial intelligence (AI) processor, and the AI processor is used for processing a computing operation related to machine learning.

The memory 1302 may include one or more computer-readable storage mediums. The computer-readable storage medium may be tangible and non-transient. The memory 1302 may further include a high-speed random access memory and a nonvolatile memory, for example, one or more disk storage devices or flash storage devices. In some embodiments, the non-transient computer-readable storage medium in the memory 1302 is used for storing at least one instruction, and the at least one instruction is used for being executed by the processor 1301 to implement the method provided by the embodiment of this application.

In some embodiments, the terminal 1300 further optionally includes: a peripheral interface 1303 and at least one peripheral device. Specifically, the peripheral device includes: at least one of a touch display screen 1305 and an audio circuit 1307.

The touch display screen 1305 is used for display a UI. The UI may include a graph, text, an icon, a video, and any combination thereof. The touch display screen 1305 further has a capability of collecting a touch signal on or above a surface of the touch display screen 1305. The touch signal may be inputted to the processor 1301 as a control signal for processing. The touch display screen 1305 is used for providing a virtual button and/or a virtual keyboard that are/is also referred to as a soft button and/or a soft keyboard. In some embodiments, there may be one touch display screen 1305, arranged on a front panel of the terminal 1300. In some other embodiments, there may be at least two touch display screens 1305, respectively arranged on different surfaces of the terminal 1300 or in a folded design. In further another embodiment, the touch display screen 1305 may be a flexible display screen, arranged on a curved surface or folded surface of the terminal 1300. Even, the touch display screen 1305 may be further arranged in a non-rectangular irregular pattern, namely, a special-shaped screen. The touch display screen 1305 may be prepared from materials such as a liquid crystal display (LCD) and an organic light-emitting diode (OLED).

The audio circuit 1307 is used for providing an audio interface between the user and the terminal 1300. The audio circuit 1307 may include a microphone and a speaker. The microphone is used for collecting sound waves from a user and an environment, and converting the sound waves into the electrical signals to be inputted into the processor 1301 for processing. For the purpose of stereo acquisition or noise reduction, there may be a plurality of microphones, respectively arranged at different portions of the terminal 1300. The microphone may further be an array microphone or an omni-directional acquisition type microphone. The speaker is used for converting the electrical signals from the processor 1301 into the sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1307 may further include an earphone jack.

An embodiment of this application further provides a computer readable storage medium, storing at least one instruction, and the at least one instruction is loaded and executed by a processor to implement the display method for the virtual chessboard described in all the embodiments above.

According to an aspect of this application, a computer program product or a computer program is provided, the computer program product or the computer program includes a computer instruction, and the computer instruction is stored in a computer readable storage medium. A processor of a terminal reads the computer instruction from the computer readable storage medium, and the processor executes the computer instruction, so that the terminal executes the display method for the virtual chessboard provided by various optional implementations in the aspects above.

A person skilled in the art is to be aware that in the foregoing one or more examples, functions described in the embodiments of this application may be implemented by hardware, software, firmware, or any combination thereof. When implemented by using software, the functions can be stored in a computer readable storage medium or can be used as one or more instructions or codes in a computer readable storage medium for transmitting. The computer readable storage medium includes a computer storage medium and a communication medium, where the communication medium includes any medium that enables a computer program to be transmitted from one place to another. The storage medium may be any available medium accessible to a general-purpose or dedicated computer.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A display method for a virtual chessboard, executed by a terminal, and comprising:

displaying a first virtual chessboard, the first virtual chessboard containing at least one first virtual chess piece;

for each of a plurality of target opponents:

displaying, in response to a lineup viewing operation for a target opponent, a second virtual chessboard corresponding to the target opponent, the second virtual chessboard containing at least one second virtual chess piece;

acquiring, in response to a marking operation for at least one target virtual chess piece in the at least one second virtual chess piece, chess piece information of the at least one target virtual chess piece; and displaying, based on the chess piece information, the at least one first virtual chess piece and the at least one target virtual chess piece through the first virtual chessboard, wherein unmarked second virtual chess pieces of the respective opponents are not displayed.

2. The method according to claim 1, wherein displaying, based on the chess piece information, the at least one first virtual chess piece and the at least one target virtual chess piece through the first virtual chessboard comprises:

determining a chess piece state of a target virtual chess piece in the at least one target virtual chess piece based on the chess piece information; and displaying, when the chess piece state is chess piece presence, the at least one first virtual chess piece and the target virtual chess piece through the first virtual chessboard.

3. The method according to claim 2, further comprising:

canceling, when the chess piece state is chess piece removal, display of the target virtual chess piece.

4. The method according to claim 3, wherein canceling, when the chess piece state is chess piece removal, display of the target virtual chess piece comprises:

canceling, when the chess piece state is chess piece removal, display of the target virtual chess piece according to a target display effect, the target display effect comprising at least one of gradual changing to disappearance, flickering and disappearing, and displaying marking cancellation prompt information on a peripheral side of the target virtual chess piece.

5. The method according to claim 3, wherein canceling, when the chess piece state is chess piece removal, display of the target virtual chess piece comprises:

displaying, when the chess piece state is chess piece removal and the target opponent replaces the target virtual chess piece with a candidate virtual chess piece, a second prompt pop-up window, the second prompt pop-up window containing prompt information for indicating that the target virtual chess piece is replaced, the candidate virtual chess piece and the target virtual chess piece having a same bond, a chess piece level of the candidate virtual chess piece being higher than a chess piece level of the target virtual chess piece, and/or the candidate virtual chess piece inheriting chess piece equipment of the target virtual chess piece; and replacing, in response to a triggering operation for a chess piece replacement control in the second prompt pop-up window, the target virtual chess piece in the first virtual chessboard with the candidate virtual chess piece based on chess piece information of the candidate virtual chess piece.

6. The method according to claim 2, wherein displaying, when the chess piece state is chess piece presence, the at least one first virtual chess piece and the target virtual chess piece through the first virtual chessboard comprises:

determining, when the chess piece state is chess piece presence, a target chess piece location corresponding to the target virtual chess piece based on the chess piece information; and displaying, when no other target virtual chess piece is placed at the target chess piece location in the first virtual chessboard, the target virtual chess piece at the target chess piece location.

7. The method according to claim 6, further comprising:

displaying, when at least one different target virtual chess piece has been placed at the target chess piece location in the first virtual chessboard, the first virtual chess piece and the target virtual chess piece through the first virtual chessboard based on a marked chess piece upper limit, the marked chess piece upper limit referring to a maximum value of a quantity of target virtual chess pieces simultaneously marked at a same chess piece location.

8. The method according to claim 7, wherein displaying, when the at least one different target virtual chess piece has been placed at the target chess piece location in the first virtual chessboard, the first virtual chess piece and the target virtual chess piece through the first virtual chessboard based on the marked chess piece upper limit comprises:

displaying, when the at least one different target virtual chess piece has been placed at the target chess piece location in the first virtual chessboard and a quantity of target virtual chess pieces placed at the target chess piece location does not reach the marked chess piece upper limit, the first virtual chess piece and the target virtual chess piece through the first virtual chessboard; and displaying chess piece identification of the at least one different target virtual chess piece at the target chess piece location on a peripheral side of the target chess piece location.

9. The method according to claim 8, further comprising:

switching, in response to a triggering operation for the chess piece identification displayed on the peripheral side of the target chess piece location, the target virtual chess piece displayed at the target chess piece location into a different target virtual chess piece corresponding to the triggered chess piece identification.

10. The method according to claim 7, wherein displaying, when the at least one different target virtual chess piece has been placed at the target chess piece location in the first virtual chessboard, the first virtual chess piece and the target virtual chess piece through the first virtual chessboard based on the marked chess piece upper limit comprises:

displaying a first prompt pop-up window when the at least one different target virtual chess piece has been placed at the target chess piece location in the first virtual chessboard and a quantity of target virtual chess pieces placed at the target chess piece location reaches the marked chess piece upper limit;

stopping, in response to a triggering operation for a chess piece replacement control in the first prompt pop-up window, display of the at least one different target virtual chess piece at the target chess piece location; and displaying the first virtual chess piece and the target virtual chess piece through the first virtual chessboard.

11. The method according to claim 10, further comprising:

canceling, in response to a triggering operation for a marking cancellation control in the first prompt pop-up window, the display of the target virtual chess piece.

12. The method according claim 2, wherein after displaying, when the chess piece state is chess piece presence, the at least one first virtual chess piece and the target virtual chess piece through the first virtual chessboard, the method further comprises:

acquiring chess piece adjustment data of the target virtual chess piece; and updating the target virtual chess piece based on a chess piece adjustment mode indicated by the chess piece adjustment data, the chess piece adjustment mode comprising at least one of chess piece location adjustment, chess piece level adjustment, and chess piece equipment adjustment.

13. The method according to claim 1, wherein a display mode of the at least one first virtual chess piece in the first virtual chessboard is different from a display mode of the at least one target virtual chess piece; and a difference in the display modes between the at least one first virtual chess piece and the at least one target virtual chess piece comprises at least one of the following:

a chess piece orientation of the at least one first virtual chess piece is different from a chess piece orientation of the at least one target virtual chess piece;

transparency of the at least one first virtual chess piece is different from transparency of the at least one target virtual chess piece; and an attribute bar color of the at least one first virtual chess piece is different from an attribute bar color of the at least one target virtual chess piece;

the at least one target virtual chess piece is highlighted; or account identification of a corresponding target opponent is displayed on a peripheral side of the at least one target virtual chess piece.

14. The method according to claim 1, wherein a virtual chessboard contains a first display area and a second display area, the at least one first virtual chess piece is located within the first display area of the first virtual chessboard, and the at least one second virtual chess piece is located within the second display area of the second virtual chessboard; and displaying, based on the chess piece information, the at least one first virtual chess piece and the at least one target virtual chess piece through the first virtual chessboard comprises:

displaying the at least one first virtual chess piece through the first display area of the first virtual chessboard, and displaying the at least one target virtual chess piece through the second display area of the first virtual chessboard based on the chess piece information.

15. The method according to claim 1, wherein acquiring, in response to a marking operation for at least one target virtual chess piece in the at least one second virtual chess piece, the chess piece information of the at least one target virtual chess piece comprises:

displaying, in response to the marking operation for the at least one target virtual chess piece, a marking setup pop-up window corresponding to the at least one target virtual chess piece, and the marking setup pop-up window containing a marking control; and acquiring, in response to a triggering operation for the marking control, the chess piece information of the at least one target virtual chess piece.

16. The method according to claim 1, wherein after displaying, based on the chess piece information, the at least one first virtual chess piece and the at least one target virtual chess piece through the first virtual chessboard, the method further comprises:

canceling, in response to a marking stop operation, display of a target virtual chess piece indicated by the marking stop operation; and canceling, when a battle preparation stage ends, the display of the at least one target virtual chess piece in the first virtual chessboard.

17. A terminal, comprising:

at least one processor;

at least one memory, the at least one memory storing at least one computer program; and wherein the at least one processor is configured by the at least one computer program to:

display a first virtual chessboard, the first virtual chessboard containing at least one first virtual chess piece;

for each of a plurality of target opponents:

display, in response to a lineup viewing operation for a target opponent, a second virtual chessboard corresponding to the target opponent, the second virtual chessboard containing at least one second virtual chess piece;

acquire, in response to a marking operation for at least one target virtual chess piece in the at least one second virtual chess piece, chess piece information of the at least one target virtual chess piece; and display, based on the chess piece information, the at least one first virtual chess piece and the at least one target virtual chess piece through the first virtual chessboard, wherein unmarked second virtual chess pieces of the respective opponents are not displayed.

18. The terminal of claim 17, wherein to display, based on the chess piece information, the at least one first virtual chess piece and the at least one target virtual chess piece through the first virtual chessboard, the at least one processor is further configured by the at least one computer program to:

determine a chess piece state of a target virtual chess piece in the at least one target virtual chess piece based on the chess piece information; and display, when the chess piece state is chess piece presence, the at least one first virtual chess piece and the target virtual chess piece through the first virtual chessboard.

19. The terminal of claim 18, wherein the at least one processor is further configured by the at least one computer program to:

cancel, when the chess piece state is chess piece removal, display of the target virtual chess piece.

20. A non-transitory computer readable storage medium, storing at least one computer program, wherein the at least one computer program comprises instructions for causing a processor to:

display a first virtual chessboard, the first virtual chessboard containing at least one first virtual chess piece;

for each of a plurality of target opponents:

display, in response to a lineup viewing operation for a target opponent, a second virtual chessboard corresponding to the target opponent, the second virtual chessboard containing at least one second virtual chess piece;

acquire, in response to a marking operation for at least one target virtual chess piece in the at least one second virtual chess piece, chess piece information of the at least one target virtual chess piece; and display, based on the chess piece information, the at least one first virtual chess piece and the at least one target virtual chess piece through the first virtual chessboard, wherein unmarked second virtual chess pieces of the respective opponents are not displayed.

* * * * *